US 9,286,059 B2

(12) United States Patent
Hatakeyama

(10) Patent No.: US 9,286,059 B2
(45) Date of Patent: Mar. 15, 2016

(54) INFORMATION PROCESSING DEVICE AND DIFFERENCE GENERATING FOR SOFTWARE PATCHING SYSTEM

(71) Applicant: Sony Computer Entertainment Inc., Tokyo (JP)

(72) Inventor: Akiyuki Hatakeyama, Kanagawa (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 14/684,757

(22) Filed: Apr. 13, 2015

(65) Prior Publication Data
US 2015/0301823 A1 Oct. 22, 2015

(30) Foreign Application Priority Data
Apr. 21, 2014 (JP) ................. 2014-087219

(51) Int. Cl.
*G06F 9/44* (2006.01)
*G06F 9/445* (2006.01)

(52) U.S. Cl.
CPC .. *G06F 8/68* (2013.01); *G06F 8/71* (2013.01); *G06F 9/445* (2013.01)

(58) Field of Classification Search
USPC .................. 717/168–175; 709/203
IPC ....... G06F 8/60,8/61, 8/65, 8/68, 8/71
See application file for complete search history.

(56) References Cited

U.S. PATENT DOCUMENTS

| | | | | |
|---|---|---|---|---|
| 6,604,236 B1* | 8/2003 | Draper et al. ........... | 717/170 |
| 6,912,711 B1* | 6/2005 | Curtis ............... | G06F 8/65 |
| | | | 709/203 |
| 6,990,660 B2* | 1/2006 | Moshir et al. ............ | 717/171 |
| 7,203,723 B2* | 4/2007 | Ogawa ................. | 709/203 |
| 7,412,700 B2* | 8/2008 | Lari et al. ............ | 717/175 |
| 7,512,941 B2* | 3/2009 | Pan .................. | G06F 17/30575 |
| | | | 707/999.201 |
| 7,590,684 B2* | 9/2009 | Herrmann ............ | H04L 63/08 |
| | | | 709/203 |
| 7,823,147 B2* | 10/2010 | Moshir .............. | G06F 8/62 |
| | | | 709/221 |
| 8,209,679 B2* | 6/2012 | Long ................ | G06F 8/68 |
| | | | 717/173 |
| 8,296,756 B1* | 10/2012 | Feeser et al. .......... | 717/173 |
| 8,316,364 B2* | 11/2012 | Stein ............... | 717/173 |
| 8,336,044 B2* | 12/2012 | Wang ............... | G06F 8/63 |
| | | | 717/168 |
| 8,346,956 B2* | 1/2013 | Day et al. ............ | 709/231 |
| 8,407,687 B2* | 3/2013 | Moshir .............. | G06F 8/62 |
| | | | 717/168 |
| 8,407,690 B2* | 3/2013 | Forsyth .............. | 717/173 |
| 8,468,516 B1* | 6/2013 | Chen ............... | G06F 8/67 |
| | | | 707/687 |

(Continued)

OTHER PUBLICATIONS

Bissyandé et al, "Typhoon : A Middleware for Epidemic Propagation of Software Updates", ACM, pp. 1-7, 2011.*
Sethanandha "Improving Open Source Software Patch Contribution Process: Methods and Tools" ACM, pp. 1134-1135, 2011.*
Lin et al, "AutoPaG: Towards Automated Software Patch Generation with Source Code Root Cause Identification and Repair", ACM, pp. 329-340, 2007.*

(Continued)

*Primary Examiner* — Anil Khatri
(74) *Attorney, Agent, or Firm* — Matthew B. Dernier, Esq.

(57) ABSTRACT

An information processing device includes: an application recording portion in which application software is recorded; a patch obtaining portion obtaining patch data from a server; a patch recording portion in which the obtained patch data is recorded; and an application executing portion executing an application using the application software and the patch data. The patch obtaining portion includes a difference information obtaining unit obtaining data block difference information between a latest patch file retained by the server and a patch file recorded in the patch recording portion, and a download executing unit downloading an updated data block from the latest patch file according to the difference information.

9 Claims, 18 Drawing Sheets

(56) References Cited

U.S. PATENT DOCUMENTS

| | | | | |
|---|---|---|---|---|
| 8,473,938 | B1 * | 6/2013 | Feeser | G06F 8/65 717/168 |
| 8,533,504 | B2 * | 9/2013 | Archer et al. | 713/320 |
| 8,584,113 | B2 * | 11/2013 | McCurdy | G06F 8/68 717/168 |
| 8,972,967 | B2 * | 3/2015 | Sannidhanam et al. | 717/170 |

OTHER PUBLICATIONS

Ali, "Software Patching in the SPC Environment and its Impact on Switching System Reliability", IEEE Journal on Selected Areas in Communications, vol. 9. No. 4., pp. 626-631, 1991.*

Stolikj et al, "Patching a Patch—Software Updates Using Horizontal Patching", IEEE Transactions on Consumer Electronics, vol. 59, No. 2, pp. 435-441, 2013.*

\* cited by examiner

F I G . 4
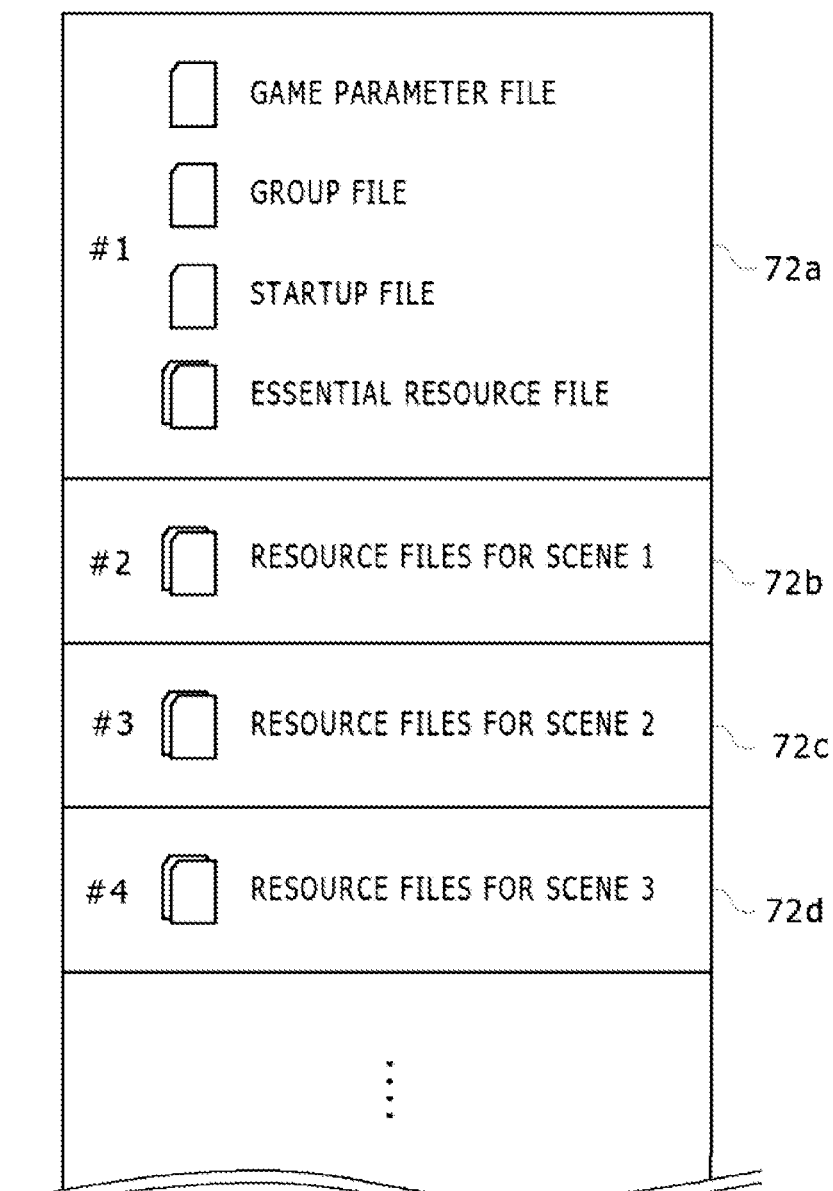

F I G . 7
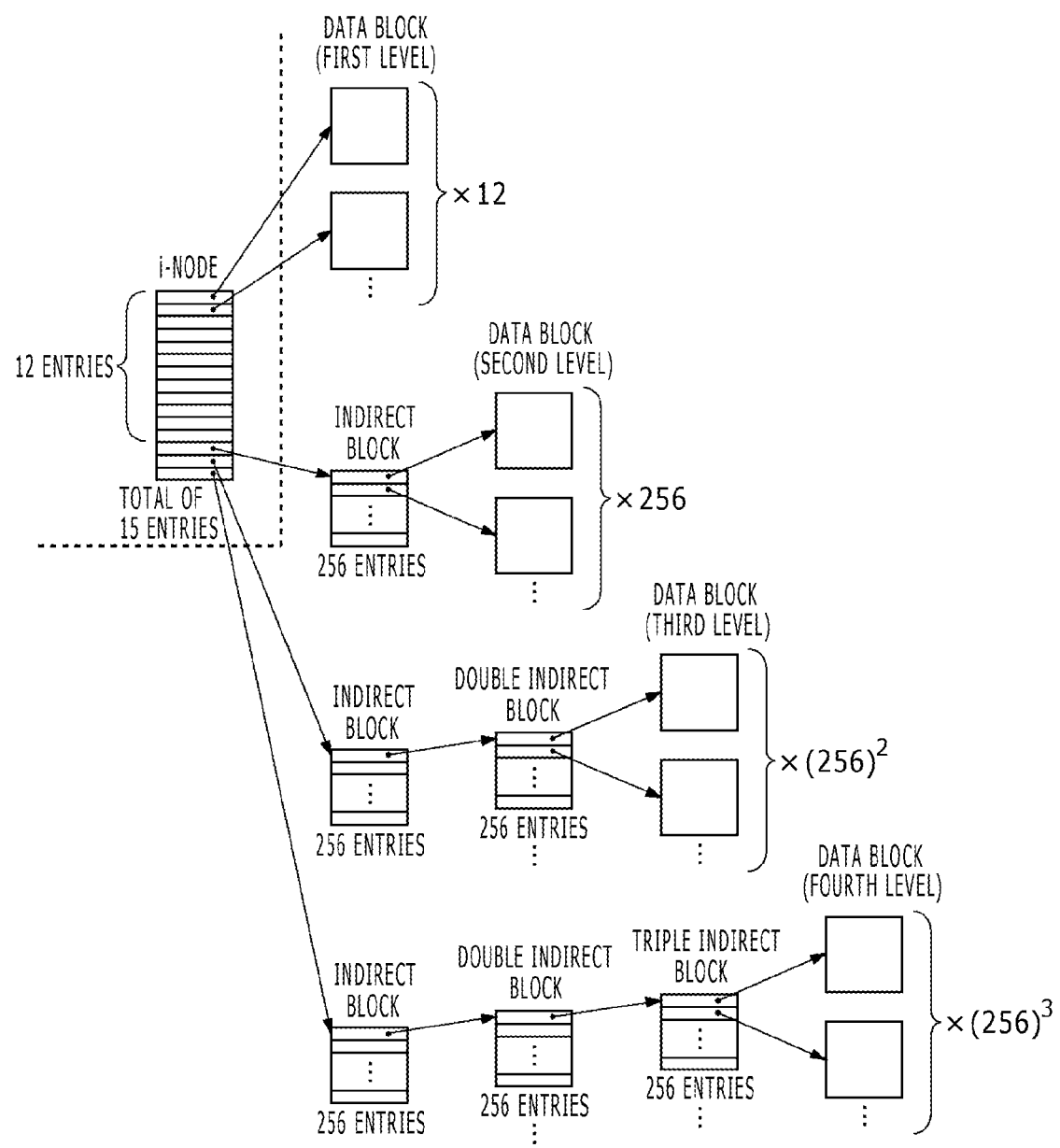

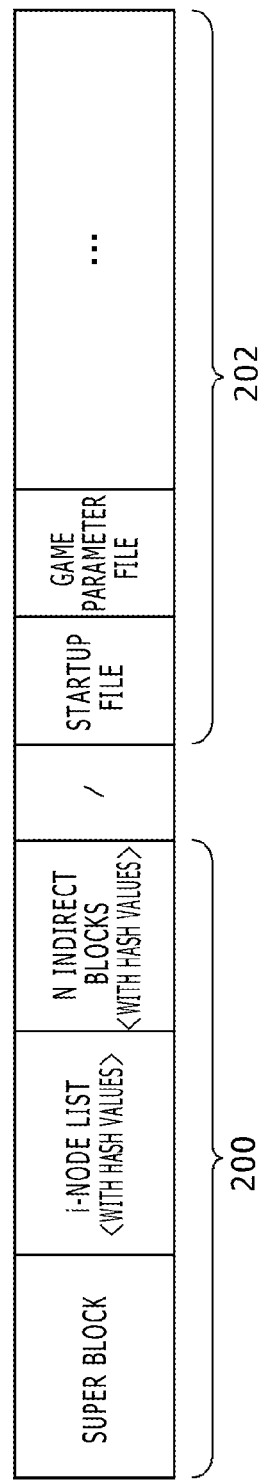

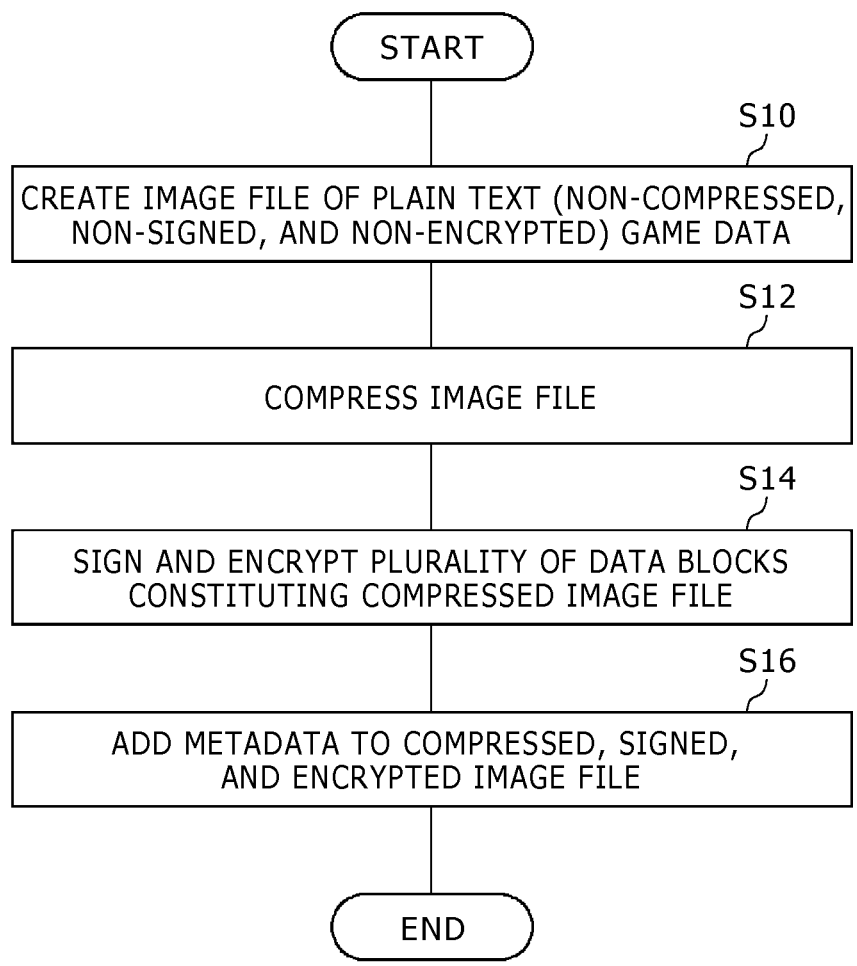

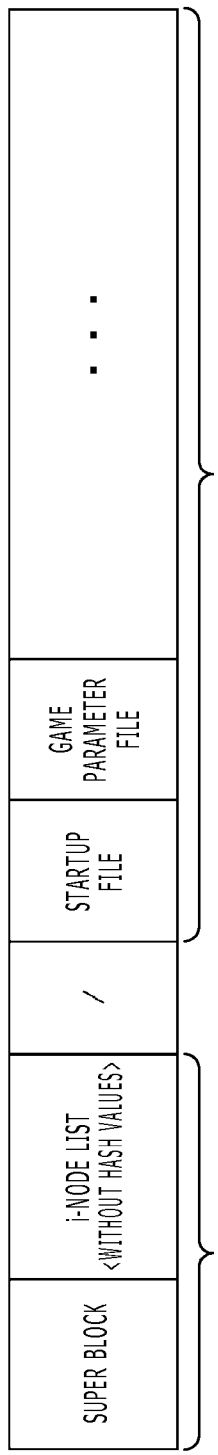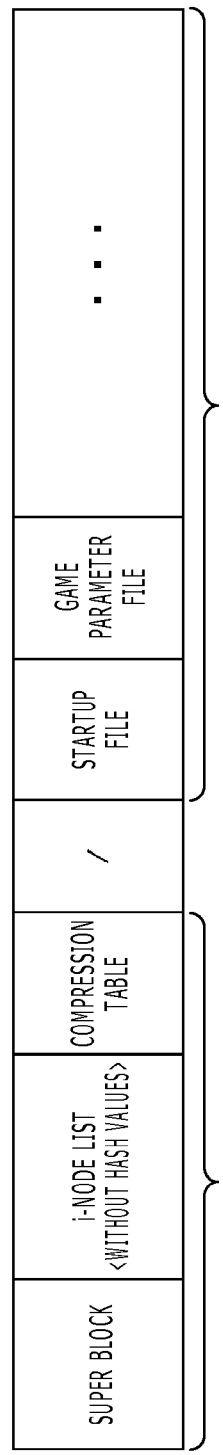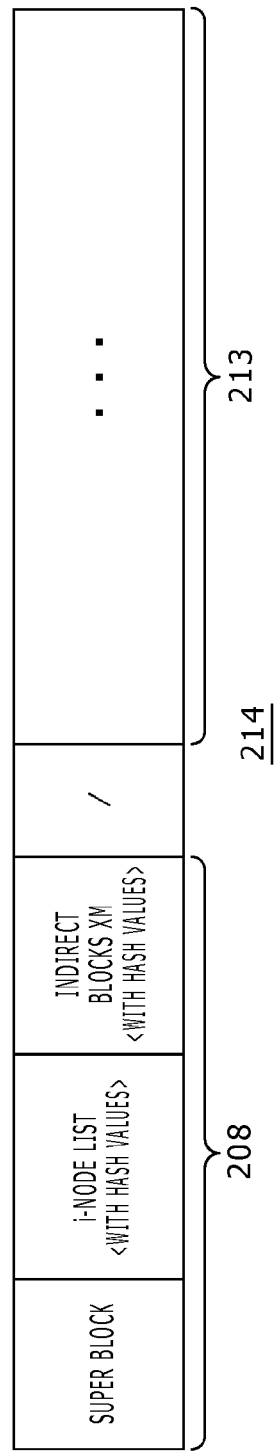

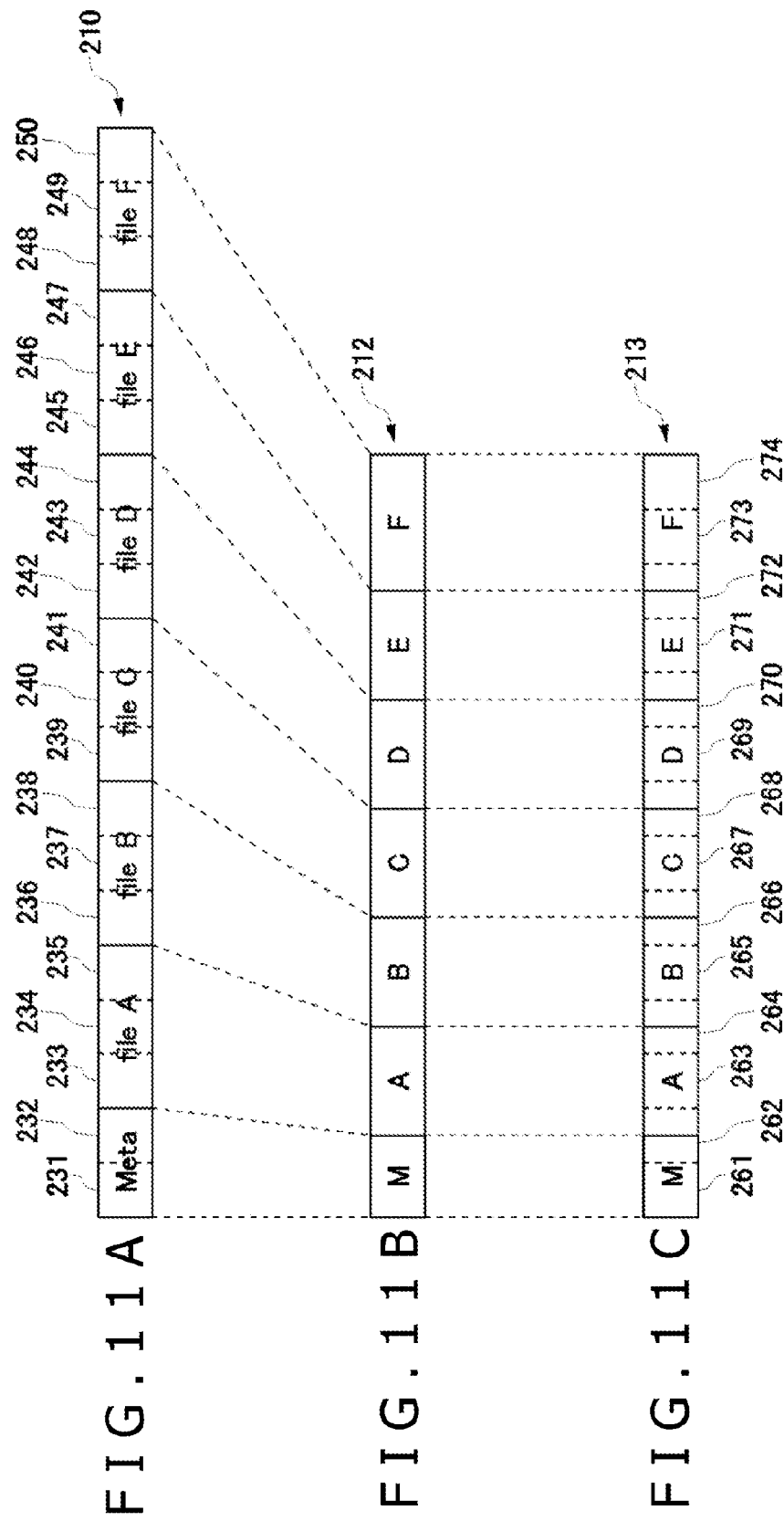

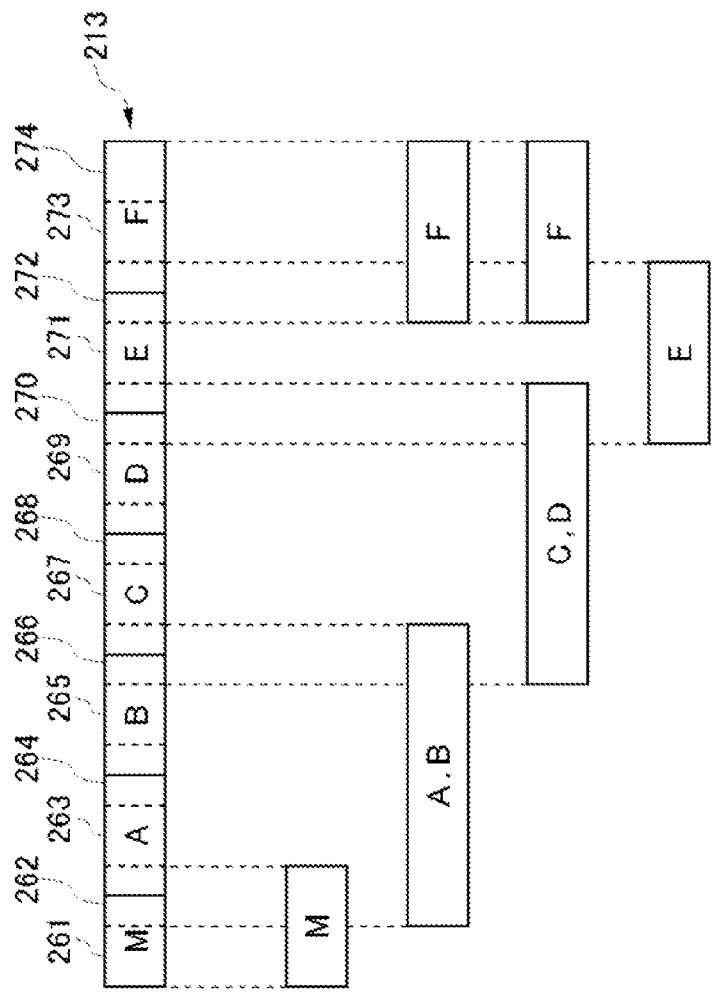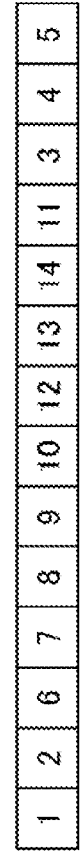

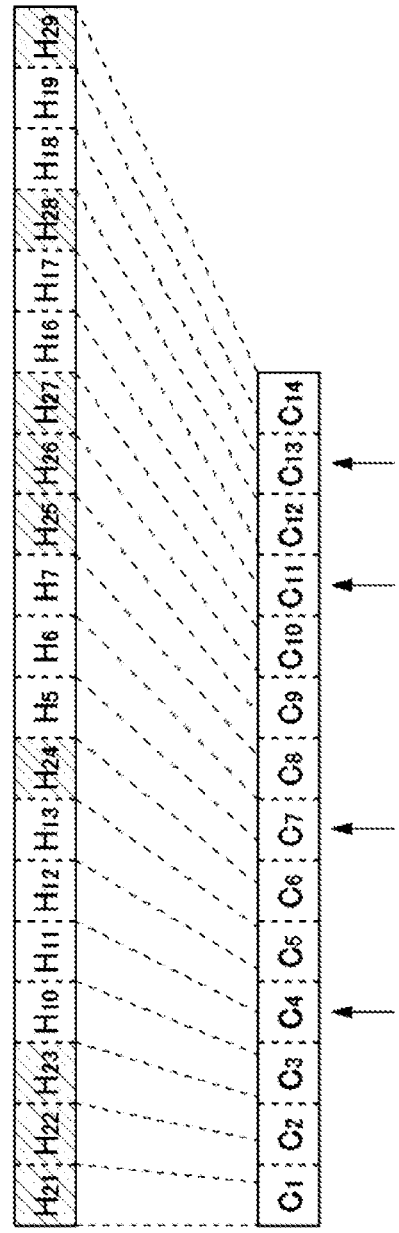

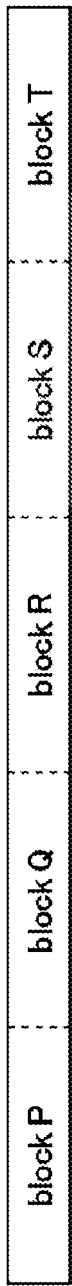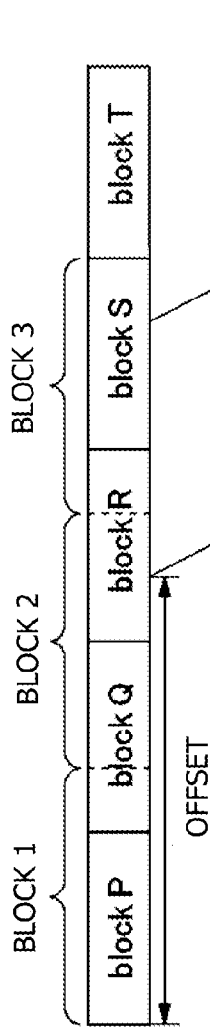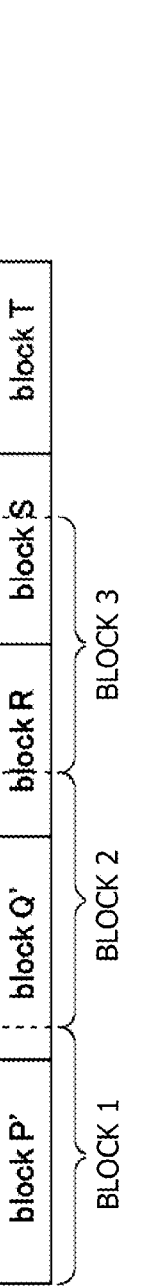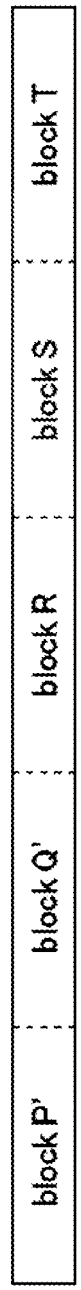
FIG. 14A VERSION 1 (BEFORE COMPRESSION)
FIG. 14B VERSION 1 (AFTER COMPRESSION)
FIG. 14C VERSION 2 (AFTER COMPRESSION)
FIG. 14D VERSION 2 (BEFORE COMPRESSION)

FIG. 15A VERSION 1 (BEFORE COMPRESSION)

| block U | block V | block W | ... | block X | block Y |
|---|---|---|---|---|---|
| BLOCK 1 | BLOCK 2 | BLOCK 3 | | | |

FIG. 15B VERSION 1 (AFTER COMPRESSION)

| block U | block V | block W | ... | block X | block Y |
|---|---|---|---|---|---|
| BLOCK 1 | BLOCK 2 | BLOCK 3 | | | |

FIG. 15C VERSION 2 (AFTER COMPRESSION)

| block U | block V | block W | ... | block X | block Y |
|---|---|---|---|---|---|
| BLOCK 1 | BLOCK 2 | BLOCK 3 | | | |

FIG. 15D VERSION 3 (AFTER COMPRESSION)

| block U' | block V' | block W | block X | block Y |
|---|---|---|---|---|
| BLOCK 1 | BLOCK 2 | BLOCK 3 | | |

INFORMATION PROCESSING DEVICE AND DIFFERENCE GENERATING FOR SOFTWARE PATCHING SYSTEM

BACKGROUND

The present technology relates to a technology of downloading data from a server, or a technology of using downloaded data. The present technology also relates to a technology of generating data for download.

In the past, game software has been distributed and sold in the form of a ROM (Read Only Memory) medium such as an optical disk, a magneto-optical disk, a Blu-ray Disk, or the like. Recent increases in speed of data communication on the Internet have enabled servers to distribute image files of game software via the Internet.

SUMMARY

Game software includes a startup file, a resource file group for executing a game such as a game program and the like, and a file group used by the OS (Operating System) of a game device. As the hardware specifications of the game device have been improved dramatically, the number of files included in the game software tends to be increased, and the data size of the game software tends to be increased.

Recently, it has become common to correct or add a scenario by applying a patch to the game software. The game device downloads a patch file from a server, and executes the game using the game software and the patch file. It is desirable that the game software and the patch file be compressed to reduce an amount of data and be signed and encrypted to enhance data security. By efficiently downloading the data of the thus compressed, signed, and encrypted patch file, the game device can immediately apply the patch to the game software and execute the game.

It is accordingly desirable to provide a technology of downloading patch data efficiently.

According to a mode of the present technology, there is provided an information processing device including: an application recording portion in which application software is recorded; a patch obtaining portion obtaining patch data from a server; a patch recording portion in which the obtained patch data is recorded; and an application executing portion executing an application using the application software and the patch data; wherein the patch obtaining portion includes a difference information obtaining unit obtaining data block difference information between a latest patch file retained by the server and a patch file recorded in the patch recording portion, and a download executing unit downloading an updated data block from the latest patch file according to the difference information.

Another mode of the present technology relates to a difference information generating device including: a recording section in which first difference information between a first patch file and a second patch file of a version subsequent to the first patch file and second difference information between the second patch file and a third patch file of a version subsequent to the second patch file are recorded; and a synthesizing section generating difference information between the first patch file and the third patch file on a basis of the first difference information and the second difference information. The difference information includes, for each data block of a patch file of a new version, information indicating whether or not the data block includes data updated from a patch file of a previous version, and when the data block does not include the updated data, the difference information includes address information indicating a data storage position in the patch file of the previous version.

Still another mode of the present technology relates to a program for a computer, including: obtaining data block difference information between a latest patch file retained by a server and a patch file recorded on a side of the computer; and downloading an updated data block from the latest patch file according to the difference information.

A further mode of the present technology relates to a program for a computer, including: reading first difference information between a first patch file and a second patch file of a version subsequent to the first patch file and second difference information between the second patch file and a third patch file of a version subsequent to the second patch file from a recording section in which the first difference information and the second difference information are recorded; and generating difference information between the first patch file and the third patch file on a basis of the first difference information and the second difference information. The difference information is configured to include, for each data block of a patch file of a new version, information indicating whether or not the data block includes data updated from a patch file of a previous version, and when the data block does not include the updated data, the difference information includes address information indicating a data storage position in the patch file of the previous version.

A still further mode of the present technology relates to a computer readable recording medium on which a program for a computer is recorded, the program including obtaining data block difference information between a latest patch file retained by a server and a patch file recorded on a side of the computer, and downloading an updated data block from the latest patch file according to the difference information.

A yet further mode of the present technology relates to a computer readable recording medium on which a program for a computer is recorded, the program including reading first difference information between a first patch file and a second patch file of a version subsequent to the first patch file and second difference information between the second patch file and a third patch file of a version subsequent to the second patch file from a recording section in which the first difference information and the second difference information are recorded, and generating difference information between the first patch file and the third patch file on a basis of the first difference information and the second difference information. The difference information is configured to include, for each data block of a patch file of a new version, information indicating whether or not the data block includes data updated from a patch file of a previous version, and when the data block does not include the updated data, the difference information includes address information indicating a data storage position in the patch file of the previous version.

It is to be noted that arbitrary combinations of the above constituent elements as well as modes realized by converting expressions of the present technology between a method, a device, a system, a recording medium, a computer program, and the like are also effective as modes of the present technology.

According to the information processing technology in accordance with the present technology, it is possible to provide a technology of downloading patch data efficiently.

BRIEF DESCRIPTION OF THE DRAWINGS

FIG. 4 is a diagram showing a concrete example of the file configuration of the game software;

FIG. 7 is a diagram of assistance in explaining a reference example of a data structure used for addressing the data blocks of a file;

FIG. 8 is a diagram showing a reference example of a data structure of game data;

FIG. 9 is a flowchart of a game data creating method;

FIGS. 10A, 10B, and 10C are diagrams showing an example of an image file of game data in the present embodiment;

FIGS. 11A, 11B, and 11C are diagrams of assistance in explaining a compressing and encrypting method in the present embodiment;

FIGS. 12A, 12B, 12C, 12D, 12E, 12F, and 12G are diagrams of assistance in explaining a method of downloading compressed, signed, and encrypted files;

FIGS. 13A, 13B, and 13C are diagrams of assistance in explaining a method of searching for reusable blocks after compression;

FIGS. 14A, 14B, 14C, and 14D are diagrams of assistance in explaining a method of generating difference information of a block;

FIGS. 15A, 15B, 15C, and 15D are diagrams of assistance in explaining a method of generating difference information between a plurality of versions;

DETAILED DESCRIPTION OF THE PREFERRED EMBODIMENTS

Figure 1:
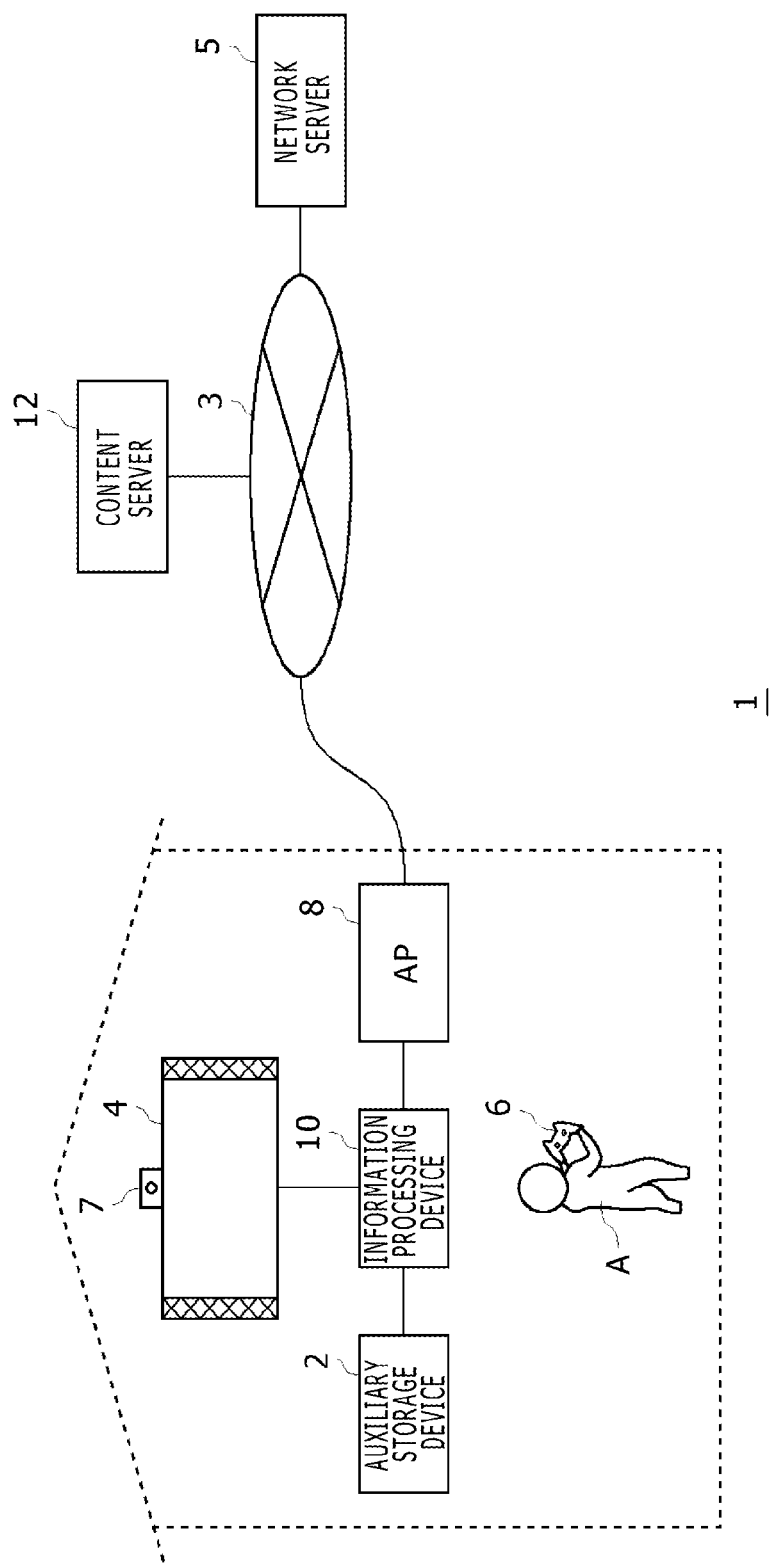
FIG. 1 is a diagram showing an information processing system according to an embodiment of the present technology.

FIG. 1 shows an information processing system 1 according to an embodiment of the present technology. The information processing system 1 includes an information processing device 10, a network server 5, and a content server 12 that distributes digital contents. The information processing device 10, the network server 5, and the content server 12 are connected to one another via a network 3 such as the Internet, a LAN (Local Area Network), or the like. The content server 12 retains digital contents such as application software and a patch file of the application or the like, and distributes the digital contents to the information processing device 10.

An access point (hereinafter referred to as an "AP") 8 has functions of a wireless access point and a router. The information processing device 10 is connected to the AP 8 via radio or wire, and is thus connected to the network server 5, and the content server 12 on the network 3 in such a manner as to be able to communicate with the network server 5, and the content server 12.

The information processing device 10 is connected to an input device 6 operated by a user by radio or wire. The input device 6 outputs operation information indicating a result of operation by the user to the information processing device 10.

When receiving the operation information from the input device 6, the information processing device 10 reflects the operation information in processing of OS (system software) or application software, and makes a result of the processing output from an output device 4. In the information processing system 1, the information processing device 10 is a game device for executing game software. The input device 6 may be a device for supplying the user operation information to the information processing device 10, such as a game controller or the like. The user can operate the OS and the application software by logging in to the OS of the information processing device 10.

The network server 5 is maintained and managed by an entity that operates the information processing system 1. The network server 5 provides the network service to the user of the information processing system 1. The network server 5 manages a network account identifying the user. The user signs in to the network service provided by the network server 5 using the network account. By signing in to the network service from the information processing device 10, the user can receive the digital contents distributed from the content server 12. Incidentally, the content server 12 may have the user managing function of the network server 5. In the present embodiment, the digital contents may be various kinds of application software and various kinds of patch data of the applications. In the following, however, description will be made of a case in particular where the digital contents are game software and patch data of the game.

An auxiliary storage device 2 is a mass storage device such as an HDD (Hard Disk Drive), a flash memory, or the like. The auxiliary storage device 2 may be an external storage device connected to the information processing device 10 by a USB (Universal Serial Bus) or the like, or may be an internal storage device. The output device 4 may be a television set including a display for outputting an image and a speaker for outputting sound, or may be a computer display. The output device 4 may be connected to the information processing device 10 by a wire cable, or may be connected to the information processing device 10 by radio.

The input device 6 includes a plurality of input portions such as a plurality of push type operating buttons, an analog stick allowing an analog quantity to be input, a rotation type button, and the like. A camera 7 as an imaging device is provided in the vicinity of the output device 4. The camera 7 images a space around the output device 4. FIG. 1 shows an example in which the camera 7 is attached to an upper portion of the output device 4. However, the camera 7 may be disposed on the side of the output device 4. In either case, the camera 7 is disposed in such a position as to be able to image the user playing a game in front of the output device 4. The camera 7 may be a stereo camera. The information processing device 10 has a function of performing face authentication of the user from an image imaged by the camera 7, and logging in the user.

Figure 2:
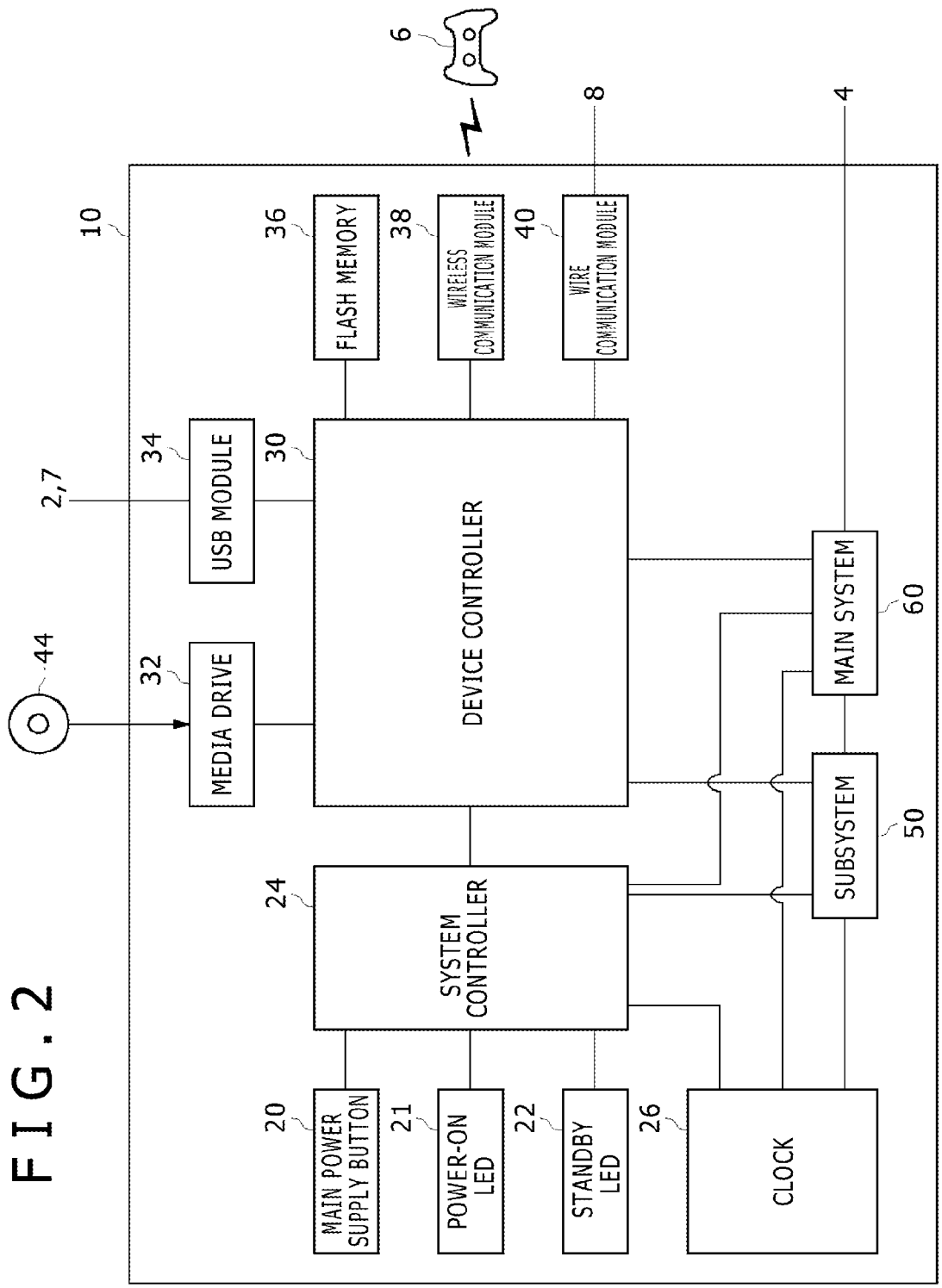
FIG. 2 is a diagram showing functional blocks of an information processing device.

FIG. 2 is a functional block diagram of the information processing device 10. The information processing device 10 includes a main power supply button 20, a power-on LED (Light-Emitting Diode) 21, a standby LED 22, a system controller 24, a clock 26, a device controller 30, a media drive 32, a USB module 34, a flash memory 36, a wireless communication module 38, a wire communication module 40, a subsystem 50, and a main system 60.

The main system 60 includes a main CPU (Central Processing Unit), a memory as a main storage device and a memory controller, a GPU (Graphics Processing Unit), and the like. The GPU is used mainly for arithmetic processing of a game program. These functions may be constructed as a system on chip, and thus formed on one chip. The main CPU has a function of executing game software recorded in the auxiliary storage device 2 or on the ROM medium 44.

The sub-system 50 includes a sub-CPU, a memory as a main storage device and a memory controller, and the like. The sub-system 50 does not include a GPU, and does not have a function of executing a game program. The number of circuit gates of the sub-CPU is smaller than the number of circuit gates of the main CPU. The power consumption in operation of the sub-CPU is lower than the power consumption in operation of the main CPU. The sub-CPU operates while the main CPU is in a standby state, and the processing functions of the sub-CPU are limited to keep the power consumption low.

The main power supply button 20 is an input portion where operating input from the user is performed. The main power supply button 20 is provided to a front surface of a casing of the information processing device 10. The main power supply button 20 is operated to turn on or off the supply of power to the main system 60 of the information processing device 10. The power-on LED 21 is lit when the main power supply button 20 is turned on. The standby LED 22 is lit when the main power supply button 20 is turned off.

The system controller 24 detects the depression of the main power supply button 20 by the user. When the main power supply button 20 is depressed while the main power supply is in an off state, the system controller 24 obtains the depressing operation as a "turn-on instruction." When the main power supply button 20 is depressed while the main power supply is in an on state, on the other hand, the system controller 24 obtains the depressing operation as a "turn-off instruction."

The clock 26 is a real-time clock. The clock 26 generates present date and time information, and supplies the present date and time information to the system controller 24, the subsystem 50, and the main system 60.

The device controller 30 is configured as an LSI (Large-Scale Integrated Circuit) that transfers information between devices like a Southbridge. As shown in FIG. 2, the device controller 30 is connected with devices such as the system controller 24, the media drive 32, the USB module 34, the flash memory 36, the wireless communication module 38, the wire communication module 40, the subsystem 50, the main system 60, and the like. The device controller 30 accommodates differences between electrical characteristics of the respective devices and differences between data transfer rates, and controls data transfer timing.

The media drive 32 is a drive device that is loaded with the ROM medium 44 on which application software such as a game or the like and license information are recorded, drives the ROM medium 44, and reads a program, data, and the like from the ROM medium 44. In the following, programs and data may be referred to collectively as data when the programs and the data are not particularly distinguished from each other. However, "data" will be used also to represent elements constituting files. The ROM medium 44 is a read-only recording medium such as an optical disk, a magneto-optical disk, a Blu-ray disk, or the like.

The USB module 34 is a module connected to an external device by a USB cable. The USB module 34 may be connected to the auxiliary storage device 2 and the camera 7 by a USB cable. The flash memory 36 is an auxiliary storage device forming an internal storage. The wireless communication module 38 performs wireless communication with, for example, the input device 6 under a communication protocol such as a Bluetooth (registered trademark) protocol, an IEEE 802.11 protocol, or the like. Incidentally, the wireless communication module 38 may support a third-generation (3rd Generation) digital mobile telephone system compliant with an IMT-2000 (International Mobile Telecommunication 2000) standard defined by the ITU (International Telecommunication Union), or may further support a digital mobile telephone system of another generation. The wire communication module 40 performs wire communication with an external device. The wire communication module 40 is connected to the network 3 via the AP 8.

Returning to FIG. 1, the content server 12 provides the information processing device 10 with game software and patch data of the game software. In response to a request from the information processing device 10, the content server 12 in the present embodiment provides data blocks of a patch file of a latest version which data blocks include data not downloaded by the information processing device 10. The patch file is updated by a game manufacturer at an appropriate time, and the latest patch file is retained in the content server 12 so as to be downloadable by the user at all times. Some data of the latest patch file is a duplication of data of a patch file of the previous version. Thus, the information processing device 10 downloads only data blocks in the latest patch file which data blocks include data not obtained in the previous patch file. When applying the latest patch to the game software, the information processing device 10 reuses the patch data already obtained in the previous patch file. This can reduce the amount of data of the latest patch file to be downloaded, and reduce a processing load on the content server 12.

The game software includes a startup file, a resource file group for executing a game such as a game program or the like, and a file group used by the OS of the information processing device 10. The image file of the game software originally recorded on the ROM medium 44 is provided to the information processing device 10. The game program is necessary to execute the game. The game progresses by running the game program. The startup file is a program for starting the game program. When the startup file is executed, the game program is called up and executed. The file group used by the OS includes for example a game icon image to be displayed on a menu screen in the information processing device 10.

The game software has a tree type directory structure. A root directory includes the startup file. Subdirectories at a lower level are classified by file type. For example, a subdirectory for a 3D (three-dimensional) model, a subdirectory for texture, a subdirectory for a script, and the like are formed as the subdirectories.

Figure 3:
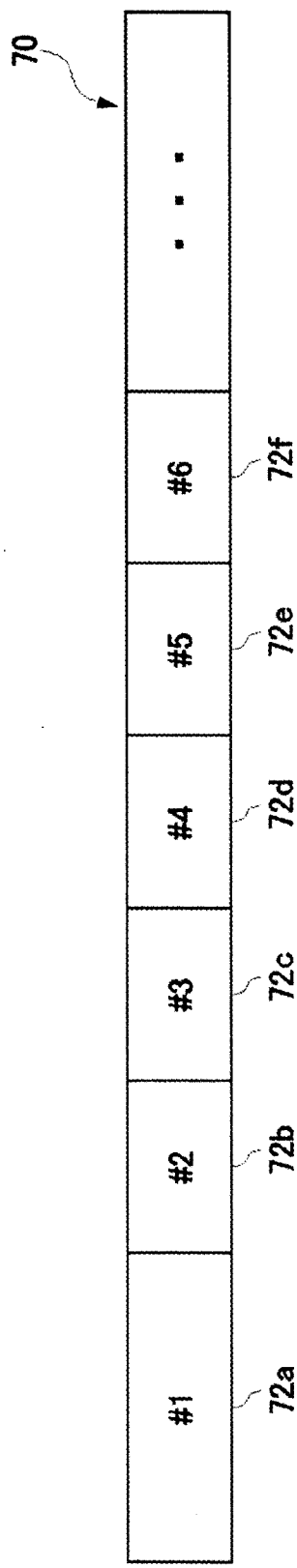
FIG. 3 is a conceptual diagram of a file configuration of game software.

FIG. 3 shows a file configuration of the game software. Main body of game software 70 according to the present embodiment is formed by a plurality of files, and is logically divided into a plurality of groups 72, as shown in the figure. Each file belongs to at least one of the plurality of groups 72, and at least one file belongs to each group 72. The game software 70 shown in FIG. 3 includes a first group 72a as a front group, and a second group 72b, a third group 72c, a fourth group 72d, a fifth group 72e, and a sixth group 72f as groups following the first group 72a. Incidentally, there may be a seventh and subsequent groups 72 following the sixth group 72f. Each group is identified by a group number such as the first, the second, or the like.

The files included in the plurality of subdirectories belong to the respective groups that are divided logically. That is, each group is formed by files of different types, and is set such that files necessary for the information processing device 10 to execute a particular unit such as a scene, a stage, or the like in the game belong to each group.

A program file and a data file necessary to start the game software 70 belong to the first group 72a. Hence, when the information processing device 10 obtains the game software 70 from the content server 12, if the information processing device 10 has downloaded all of the files belonging to the first group 72a, the information processing device 10 can immediately start the game software 70 even if the information processing device 10 has not downloaded the files of the following second group 72b and the subsequent groups. Incidentally, after the information processing device 10 has obtained all of the files belonging to the first group 72a and started the game software 70, the information processing device 10 downloads the files belonging to the following groups 72 in the background. The download waiting time of the user can be shortened by thus making a minimum of files necessary to execute the game downloaded first and allowing the game to be executed at a point in time that these files are obtained. Incidentally, in the present embodiment, the game software 70 recorded on the ROM medium 44 and the game software 70 downloaded from the content server 12 or the like have a data structure with a same file and directory configuration.

FIG. 4 shows a concrete example of file configuration of the game software. The first group 72a is formed by a file group to be downloaded first in the game software 70. In this case, a game parameter file, a group file, a startup file, and an essential resource file are shown as the first group 72a.

Here, the game parameter file is used by the OS of the information processing device 10. The game parameter file includes for example information such as a title ID, a display resolution, and the like, icon image data, and the like.

The group file is a definition file describing in which group each file is included. For example, the group file may be represented in XML (Extensible Markup Language). However, the group file may be represented in another program language in any form. The group file will be described later with reference to FIG. 5 and FIG. 6.

The startup file is a program for starting the game program. The essential resource file includes a resource file such as a program essential for the execution of the game or the like, a common file used in the whole of the game, and the like.

When the information processing device 10 downloads the game software 70 from the content server 12 or the like, the information processing device 10 can start the game when obtaining all of the file group belonging to the first group 72a. Conversely, the first group 72a includes a file group necessary for the user to play a part of the game. Incidentally, the game play in this case may also include a setting action performed at a time of a start of the game, such for example as determination of a character or determination of a game level by the user. That is, the first group 72a includes a file group necessary to start the game and allow the user to perform at least some operation. The game play that can be performed using the file group included in the first group 72a may be for example only an initial setting for the game or such that up to a first stage of the game can be played. This depends on the game manufacturer.

In the example shown in FIG. 4, a plurality of resource files for scene 1 belong to the second group 72b, a plurality of resource files for scene 2 belong to the third group 72c, and a plurality of resource files for scene 3 belong to the fourth group 72d. Specifically, the plurality of resource files are 3D model files, texture files, script files, and the like for the particular scenes, and include files included in the plurality of subdirectories of the directory structure.

Figure 5:
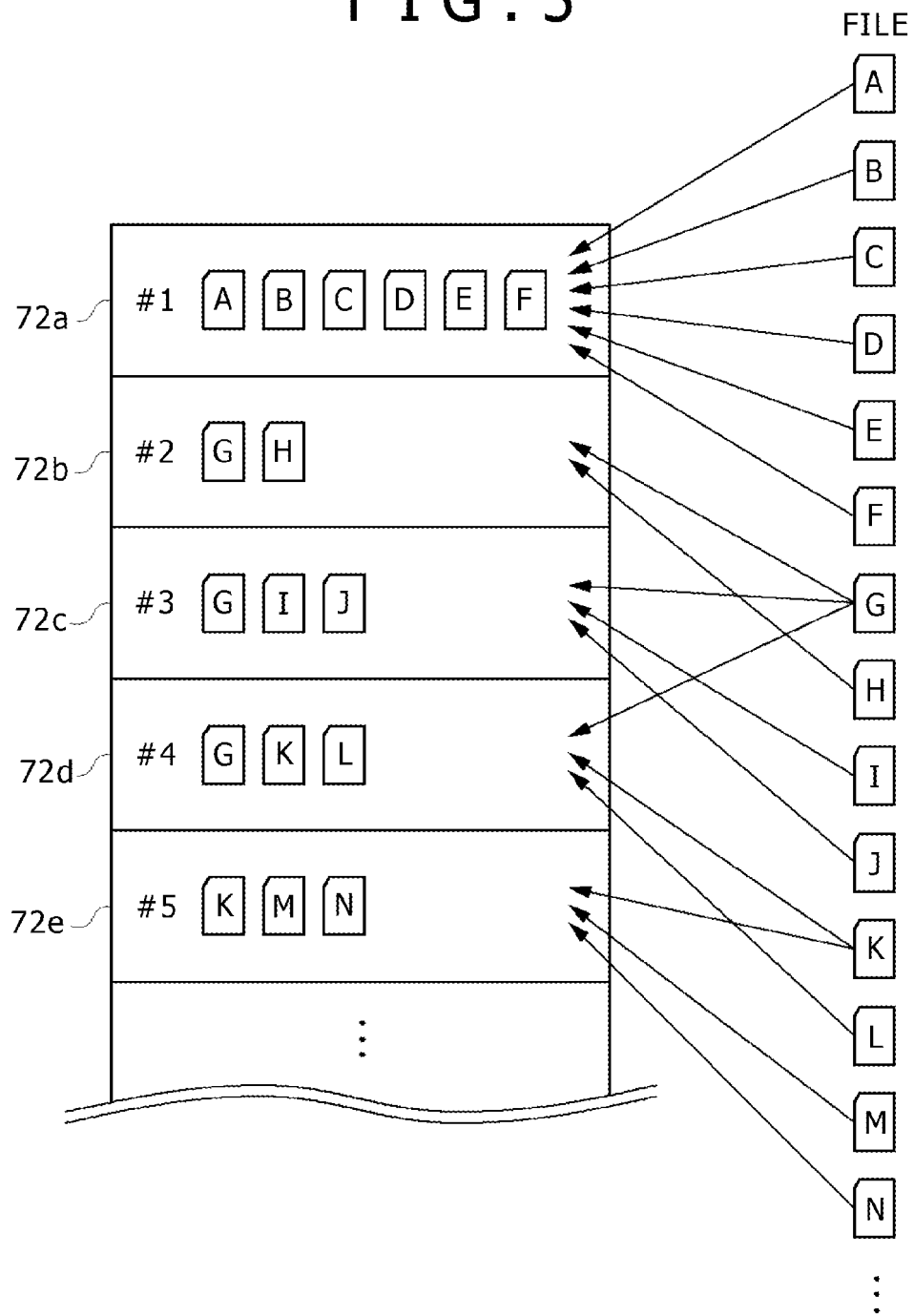
FIG. 5 is a diagram showing an example of relation between groups and files.

FIG. 5 shows an example of relation between groups and files. In this case, files A to N are shown belonging to respective groups 72. As shown in the figure, each file belongs to at least one of a plurality of groups 72, and at least one file belongs to each group 72. Incidentally, the file G belongs to the second group 72b, the third group 72c, and the fourth group 72d. This means that the file G is necessary to form scene 1, scene 2, and scene 3 in the game. One file may thus belong to a plurality of groups. Incidentally, the file K also belongs to a plurality of groups 72, that is, the fourth group 72d and the fifth group 72e.

Figure 6:
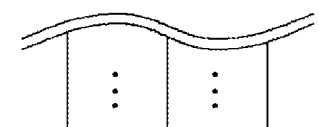
FIG. 6 is a diagram showing an example of a group file.

FIG. 6 shows an example of a group file. As described above, the group file may be represented in XML, or may be represented in another program language. FIG. 6 shows a group file representing correspondence relation between groups and files in a table format to facilitate understanding. When the information processing device 10 downloads each file of the game software 70, the information processing device 10 can determine whether all files belonging to a certain group are obtained or not obtained by referring to the group file. For example, as for the first group 72a, the information processing device 10 can recognize that the files belonging to the first group 72a are files A, B, C, D, E, and F by referring to the group file. Thus, when these files are recorded in the auxiliary storage device 2, the information processing device 10 determines that all of the files belonging to the first group 72a are obtained.

The game software 70 is thus formed by a plurality of groups, whereby the information processing device 10 can download files according to download order defining the order of priority of downloading the groups. When the game software 70 includes resource files for single play in which one person plays and resource files for multiple play in which a plurality of people play, and the user desires single play, a group for single play is preferentially downloaded, and a group for multiple play can be downloaded in the background while the single play is enjoyed. When the user desires multiple play, on the other hand, the group for multiple play is preferentially downloaded, and the group for single play can be downloaded in the background while the multiple play is enjoyed.

Incidentally, in the present embodiment, the game software is compressed, signed, and encrypted. As will be described later, as with the game software, patch files are also compressed, signed, and encrypted. The game software and patch files thus compressed, signed, and encrypted are configured with data blocks of a predetermined size (for example 64 kilobytes) allocated thereto. A data block is a basic unit for the file system to transfer data. In the present embodiment, the data of a file can be distributed in data block units. Thus, the group files shown in FIG. 6 may have recorded therein correspondence relations between the respective groups and the numbers of data blocks including the data of the files belonging to the respective groups. The group files shown in FIG. 6 may also have recorded therein correspondence relations between the respective groups and the addresses of the data blocks including the data of the files belonging to the respective groups.

The following description will be made of the data structure of the game software according to the present embodiment. In the present embodiment, the game software is configured using a file management method used in UNIX (registered trademark). The game software includes at least a plurality of files and metadata. Prior to the description of the data structure according to the present embodiment, a data structure for addressing is shown for reference in FIG. 7, and an comparative example of a data structure for comparison with the data structure according to the present embodiment is shown in FIG. 8.

FIG. 7 is a diagram of assistance in explaining a reference example of a data structure used for addressing the data blocks of a file. A first index table at a first level is referred to as an index node ("i-node" for short), and has a total of 15 entries for addressing the data blocks. All files are constituted of an i-node and data blocks. The i-node is given an i-node number for identifying the file in the file system. The i-node has, as attribute information, the i-node number, the type of the file, the byte length of the file, an access right, and the like.

In the data structure shown as a reference example, information for identifying the recording locations of the data blocks is recorded in the entries of the i-node. This information may be block numbers that specify a relative position from a start of a recording disk or a partition, for example. Incidentally, the information for identifying the recording locations of the data blocks is not limited to block numbers, but may be for example information such as a block size for calculating a block number, a file offset, or the like. In addition, the information for identifying the recording locations of the data blocks may be sector numbers of the recording disk which sector numbers directly identify the recording locations.

A file name and the i-node number (having a meaning as a pointer to the i-node) of the i-node managing the file are retained in association with each other in a data block of a directory. Hence, when the game program refers to the file by the file name, the kernel of the OS refers to information of a directory entry, obtains the i-node number corresponding to the file name, and accesses the file using the block numbers included in the i-node identified by the i-node number.

The 12 entries of the i-node are used to record the block numbers of 12 data blocks from a start within the file. Hence, when the file is formed by 12 or fewer data blocks, the i-node can record the block numbers of the respective data blocks using entries the number of which is equal to the number of the blocks.

Incidentally, when the file is formed by 13 or more blocks, index tables at a plurality of levels are necessary. In the example shown in FIG. 7, the block number of an index table at a second level (indirect block) is recorded in the 13th entry of the i-node. The 13th entry of the i-node is linked to the indirect block, and is thus used for indirect reference in a first stage. The indirect block has a fixed data size, and has 256 entries. The block numbers of data blocks at the second level are recorded in the entries of the indirect block.

The block number of an index table at the second level (indirect block) for linking an index table at a third level (double indirect block) is recorded in the 14th entry of the i-node. The block number of the double indirect block is recorded in an entry of the indirect block. The double indirect block has 256 entries. The block numbers of data blocks at the third level are recorded in the entries of the double indirect block. The 14th entry of the i-node is thus used for indirect reference in a second stage.

The block number of an index table at the second level (indirect block) for linking an index table at the third level (double indirect block) for linking an index table at a fourth level (triple indirect block) is recorded in the 15th entry of the i-node. The block number of the double indirect block is recorded in an entry of the indirect block. The block number of the triple indirect block is recorded in an entry of the double indirect block. The triple indirect block has 256 entries. The block numbers of data blocks at the fourth level are recorded in the entries of the triple indirect block. The 15th entry of the i-node is thus used for indirect reference in a third stage.

The index tables at the second and subsequent levels (that is, the index tables other than the i-node) may hereinafter be referred to collectively as indirect blocks.

In the data structure of the file shown as a reference example, each entry of the index tables also stores the hash value of data included in the data block together with the block number. The hash value is for example a data value of 32 bytes. Recording the hash value of the data within the data block in the entry in which the data block is registered enables the data to be verified when the data of the block is read out, and also enables the data to be prevented from being tampered with.

As described above, an indirect block has a fixed data size. When an indirect block is used as an index table, a region of a fixed length needs to be secured. For example, in a case where the number of blocks of one file is 20, the data blocks are registered in the 12 entries of an i-node and eight entries of an indirect block at a second level, and respective block numbers and hash values are recorded in the entries. As a result, 248 (=256−8) remaining entries of the indirect block at the second level are empty, and are thus unnecessary regions that do not contribute as metadata.

The main body of the game software 70 includes a plurality of files, for example more than 10000 files. In this file system, for a purpose of reading out the files, the metadata recorded in the i-nodes and the indirect blocks is all expanded in a memory such as DDR3 (double-data-rate3) or the like. Incidentally, it is desirable to also read out as many files as possible into the memory. Hence, the data size of the metadata is desirably as small as possible.

However, as described above, when there is a large amount of null data in entries of indirect blocks, the null data is also expanded in the memory, and consequently decreases the memory space. In the case of the game software 70 including more than 10000 files, in particular, when index tables for each file are prepared, metadata including null data may exceed 1 Gbytes.

FIG. 8 shows a reference example of a data structure of game data. The reference example is shown for comparing with the data structure according to the present embodiment. The data structure shown in the reference example is obtained by adding a metadata region 200 including a super block, an i-node list, and a plurality of (N) indirect blocks to a game data region 202 including a plurality of (for example 10000) files. The super block has recorded therein information for managing the files included in the game data region 202, and includes metadata such as a block size, a total number of blocks, and the like. The i-node list includes i-nodes equal in number to at least the number of files included in the game data region 202 (for example 10000). (Incidentally, to be exact, in this file system, directories and file names are also treated as one file, and therefore the i-node list also includes an i-node related to the directories and the file names.)

The indirect blocks are provided for files whose data blocks cannot be registered in the 12 entries of the i-node. In the present reference example, as already described, entries of the i-nodes and the indirect blocks include block numbers and the hash values of data included in the data blocks.

Therefore, when the game data region 202 includes the 10000 files, there are a large number of indirect blocks. In some indirect blocks, most of the entries may include null data, as described above. The data size of the metadata region 200 therefore becomes unnecessarily large. It is not desirable from a viewpoint of efficient use of the memory to expand the metadata included in the metadata region 200 in the memory during execution of the game program.

Accordingly, the game software according to the present embodiment has a data structure in which the data size of metadata is minimized, rather than the data structure having a hash value for each block of each file. Specifically, a completely plain text image file in which a plurality of files without a signature (hash value) are lumped together is created, and game data obtained by adding metadata to the image file is created. Incidentally, the image file refers to one formed as one file including the structure of a file system, control information, and the like.

With the data structure of the game data in the present embodiment, a plurality of files are recorded in consecutive locations (blocks) on a recording medium. Thereby, the recording location of each file can be identified when a start position and a file size are retained as metadata in an entry of an i-node. It therefore becomes unnecessary to have information for identifying the recording location of each data block such as a block number or the like. In addition, by not attaching a signature for each data block, it becomes unnecessary to have a hash value for each data block as metadata of each file. Thus, the metadata of each file can be contained in the entries of an i-node. That is, when no hash value is generated for each block, and further the data blocks are recorded in blocks of consecutive numbers, indirect blocks are rendered unnecessary, so that the data size of the metadata can be reduced greatly.

FIG. 9 is a flowchart of a game data creating method according to the present embodiment. Steps shown in the flowchart represent a process in which a game manufacturer creates final game package software, and are implemented by package creating software. First, the package creating software creates an image file of plain text game data (without compression, without encryption, and without signatures) (S10). As already described, the image file is formed as one file including the structure of a file system, control information, and the like.

FIG. 10A shows an example of the completely plain text image file of the game data in the present embodiment. The image file 210 has a data structure obtained by adding a metadata region 204 including a super block, and an i-node list to a game data region 202 including a plurality of (for example 10000) files. The super block has recorded therein information for managing the files included in the game data region 202, and includes metadata such as a block size, a total number of blocks, and the like.

Logical blocks having consecutive numbers are allocated to the plurality of game files included in the game data region 202. The arrangement of the blocks allocated to the plurality of game files included in the game data region 202 enables the storage location of one game file on the recording medium to be identified by a start block number to which the file is allocated and the data size of the file. Therefore, the recording location of the file is identified by recording the start block number of the file and the data size of the file in the i-node of the game file. Thus, when the OS accesses the game file, the recording location of the game file can be identified by obtaining the i-node number of the game file. Incidentally, the block size is 64 kilobytes, and each file is stored in a state of being aligned in data blocks of 64 kilobytes.

No signature is attached to the game files recorded in the game data region 202. Thus, there is no hash value for each block. Hence, it is not necessary to prepare indirect blocks for recording the metadata of a file, and the metadata of the file can be contained in one entry of the i-node. Therefore, the i-node list in the metadata region 204 includes i-nodes equal in number to the number of files in the game data region 202. On the other hand, as is clear from comparison with FIG. 8, the metadata region 204 does not include a plurality of indirect blocks related to the files. Incidentally, as already described, in this file system, directories and file names are also treated as one file. Thus, the i-node list also includes an i-node related to the directories and the file names. In this case, however, no signature is attached to the directories and the file names, so that indirect blocks do not need to be prepared.

A comparison with the metadata region 200 shown in FIG. 8 shows that the data size of the metadata region 204 shown in FIG. 10A can be reduced greatly because the metadata region 204 does not include indirect blocks. Therefore, even when the metadata included in the metadata region 204 is read out into the memory such as DDR3 or the like during execution of the game program, the metadata has only a small data size.

Returning to FIG. 9, the package creating software compresses a plain text image file 210 shown in FIG. 10A (S12). The compression is performed in each block. FIG. 10B shows an example of the compressed image file. The package creating software allocates logical blocks (that also have a size of 64 kilobytes) having consecutive numbers to the compressed image file 212. That is, the package creating software compresses a plurality of blocks included in the game data region 202, couples all of the compressed blocks to each other, and allocates logical blocks to the coupled compressed data. In this state, files and blocks are not in coinciding relation to each other, and when one block is viewed, the one block may include data of a plurality of (for example two) files. In the compressed image file 212, a compression table indicating relation between the blocks of the files before the compression and after the compression is written to a metadata region 205. The size of the plain text image file 210 before the compression is described in the header part of the compression table, and the block numbers before the compression, the block numbers after the compression, and offset positions within the blocks of the block numbers after the compression are described in association with each other in the table part of the compression table. Incidentally, in the table part, in regard to the blocks, addresses before the compression and addresses changed after the compression may be described in association with each other. Such compression reduces the data size of a game data region 206 as compared with the data size of the game data region 202.

The image files 210 and 212 shown in FIG. 10A and FIG. 10B can be used as an image file of game data as they are. That is, when the OS in the information processing device 10 mounts the image file 210 or 212 at a predetermined mount point for executing the game, a startup file is started to execute the game program. At this time, the data sizes of the metadata regions 204 and 205 can be made small without including indirect blocks, so that the metadata can be expanded in the memory efficiently.

However, no signature is attached to and no encryption is performed on the image files 210 and 212. There is thus a disadvantage in that when the data of the blocks is read out, the data cannot be verified, and the data cannot be effectively prevented from being tampered with. Accordingly, in the present embodiment, the image file 212 in an archive format is treated as one file, a signature is attached, and further encryption is performed to create secure game data.

The package creating software regards the compressed image file 212 as one file, and allocates logical blocks having consecutive numbers to the image file 212. The package creating software attaches a signature to each of the plurality of blocks constituting the compressed image file 212, or specifically obtains a hash value of each piece of block data, and performs encryption (S14). The hash value of each piece of block data is added to the encrypted image file 213 as one piece of metadata included in a metadata region 208 (S16). Incidentally, in order to enhance the security of the game data, the package creating software may attach a signature to the created metadata, and further perform encryption processing on the metadata and the main body of the game data.

FIG. 10C shows an example of a data structure of game data according to the present embodiment. The game data having this data structure is recorded as a package file 214 on the ROM medium 44, or downloaded as a package file 214 from the content server 12 or the store server 16 to the information processing device 10 and recorded on the auxiliary storage device 2.

As shown in FIG. 10C, the package file 214 has a data structure in which the encrypted image file 213 is nested. The data structure according to the present embodiment is obtained by adding a metadata region 208 including, as metadata, a super block, an i-node list, and a plurality of (M) indirect blocks to the image file 213 treated as one file.

The super block has recorded therein information for managing the image file 213, and includes metadata such as a block size, a total number of blocks, and the like. Metadata including the hash values of respective blocks of the image file 213 is recorded in entries of the i-node of the image file 213 which i-node is included in the i-node list and a plurality of indirect blocks, the entries including at least a number of entries which number is equal to the number of blocks obtained by dividing the image file 213 regarded as one file. The package file 214 thus has a data structure in which the compressed and encrypted image file 213 is divided in a predetermined block size, and consecutive block numbers are assigned to respective blocks.

Description will be made of relation between the image files illustrated in FIGS. 10A to 10C.

FIGS. 11A to 11C are diagrams of assistance in explaining the image files including metadata and files A to F. Incidentally, suppose that a data group represented as the metadata in FIGS. 11A to 11C for the convenience of description not only includes the metadata but also includes the files included in the first group 72a shown in FIG. 4. As will be described later with reference to FIGS. 12A to 12G, the aggregate of data shown as the metadata in FIGS. 11A to 11C includes the files included in the first group 72a, and therefore the information processing device 10 can start a program by downloading the first group 72a represented as the metadata in FIGS. 11A to 11C for convenience.

FIG. 11A shows an example of configuration of the image file 210 before compression. In this case, the metadata is stored in a first block 231 and a second block 232. The file A is stored in a third block 233, a fourth block 234, and a fifth block 235. The file B is stored in a sixth block 236, a seventh block 237, and an eighth block 238. The file C is stored in a ninth block 239, a tenth block 240, and an eleventh block 241. The file D is stored in a twelfth block 242, a thirteenth block 243, and a fourteenth block 244. The file E is stored in a fifteenth block 245, a sixteenth block 246, and a seventeenth block 247. The file F is stored in an eighteenth block 248, a nineteenth block 249, and a twentieth block 250. Each of the blocks has a data size of 64 kilobytes. Thus, in the image file 210 before compression, the metadata and each of the files are stored in a state of being aligned in the blocks of 64 kilobytes.

FIG. 11B shows an example of configuration of the compressed image file 212. The image file 212 is generated by compressing each of the blocks of the image file 210, and coupling the compressed blocks to each other.

FIG. 11C shows an example of configuration of the image file 213 in which the compressed image file 212 is divided into blocks of 64 kilobytes, and signed and encrypted in each block. The compressed, signed, and encrypted metadata (M) is stored in a first block 261 and a part of a second block 262.

In addition, the compressed, signed, and encrypted file A is stored in a part of the second block 262, a third block 263, and a part of a fourth block 264. The compressed, signed, and encrypted file B is stored in a part of the fourth block 264, a fifth block 265, and a part of a sixth block 266. The compressed, signed, and encrypted file C is stored in a part of the sixth block 266, a seventh block 267, and a part of an eighth block 268. The compressed, signed, and encrypted file D is stored in a part of the eighth block 268, a ninth block 269, and a part of a tenth block 270. The compressed, signed, and encrypted file E is stored in a part of the tenth block 270, an eleventh block 271, and a part of a twelfth block 272. The compressed, signed, and encrypted file F is stored in a part of the twelfth block 272, a thirteenth block 273, and a fourteenth block 274. Thus, the image file 212 after the compression is divided by blocks of 64 kilobytes, and encryption is performed within each of the blocks. Incidentally, common key encryption is adopted as the encryption in the present embodiment. Hence, no increase or decrease occurs between the data before and after the block encryption.

FIGS. 12A to 12G are diagrams of assistance in explaining a method of downloading the compressed, signed, and encrypted files. FIG. 5 and FIG. 6 show an example of relation between groups and files. However, apart from the example, FIGS. 12A to 12G show relation between groups and files in a simplified manner in order to facilitate understanding.

In the image file 213 shown in FIG. 12A, as described above, the metadata M is shown as metadata corresponding to the first group 72a. Incidentally, the first group 72a further includes the metadata included in the metadata region 208 shown in FIG. 10C.

FIG. 12B shows the data blocks that represent the files belonging to the first group 72a. The first group 72a is stored in the first block 261 and a part of the second block 262. Therefore, in order to obtain the first group 72a, the first block 261 and the second block 262 need to be downloaded.

FIG. 12C shows the data blocks that represent the files belonging to the second group 72b. The second group 72b includes the files A, B, and F. The file A is stored in a part of the second block 262, the third block 263, and a part of the fourth block 264. The file B is stored in a part of the fourth block 264, the fifth block 265, and a part of the sixth block 266. The file F is stored in a part of the twelfth block 272, the thirteenth block 273, and the fourteenth block 274. Hence, in order to obtain the second group 72b including the files A, B, and F, the second to sixth blocks 262 to 266 and the twelfth to fourteenth blocks 272 to 274 need to be downloaded.

FIG. 12D shows the data blocks that represent the files belonging to the third group 72c. The third group 72c includes the files C, D, and F. The file C is stored in a part of the sixth block 266, the seventh block 267, and a part of the eighth block 268. The file D is stored in a part of the eighth block 268, the ninth block 269, and a part of the tenth block 270. The file F is stored in a part of the twelfth block 272, the thirteenth block 273, and the fourteenth block 274. Hence, in order to obtain the third group 72c including the files C, D, and F, the sixth to tenth blocks 266 to 270 and the twelfth to fourteenth blocks 272 to 274 need to be downloaded.

FIG. 12E shows the data blocks that represent the file belonging to the fourth group 72d. The fourth group 72d includes the file E. The file E is stored in a part of the tenth block 270, the eleventh block 271, and a part of the twelfth block 272. Hence, in order to obtain the fourth group 72d including the file E, the tenth to twelfth blocks 270 to 272 need to be downloaded.

Here, suppose that the second group 72b is resource files for single play, that the third group 72c is resource files for multiple play, and that the fourth group 72d is resource files for ending. A user who will play alone (single play), for example, does not immediately need the third group 72c for play by a plurality of people (multiple play). On the other hand, a user who will perform multiple play does not immediately need the second group 72b for single play.

That is, it suffices for the user who will perform single play to first download the first group 72a, thereafter download the second group 72b and the fourth group 72d in this order, and finally download the third group 72c. This is because this user is not interested in multiple play at the time of the download, and it is thus desirable that the resource files for single play and the resource files for ending be downloaded at once to allow the single play of the game.

On the other hand, it suffices for the user who will perform multiple play to first download the first group 72a, thereafter download the third group 72c and the fourth group 72d in this order, and finally download the second group 72b. This is because this user is not interested in single play at the time of the download, and it is thus desirable that the resource files for multiple play and the resource files for ending be downloaded at once to allow the game to be played by a plurality of users.

Accordingly, when the user downloads the game software, options of "preferentially download the game for single play" and "preferentially download the game for multiple play" are presented on the screen of the output device 4. According to a selected option, the content server 12 provides the information processing device 10 with order information indicating the download order of the groups. The information processing device 10 downloads the game files from the content server 12 according to the order information. Incidentally, the order information is included in the metadata (first group 72a), so that the information processing device 10 may perform download in group units in the order that is in accordance with the order information after downloading the first group 72a. In the information processing system 1 according to the present embodiment, the download order of the files is thus set according to a play mode desired by the user, that is, single play or multiple play.

FIG. 12F shows the download order for single play. This download order defines the order of block numbers of the blocks to be downloaded. Numbers shown in FIG. 12F denote the block numbers. According to this download order, the first group 72a, the second group 72b, the fourth group 72d, and the third group 72c are downloaded in this order. Thus, as shown in FIG. 12F, the blocks are downloaded in order of the first block 261, the second block 262, the third block 263, the fourth block 264, the fifth block 265, the sixth block 266, the twelfth block 272, the thirteenth block 273, the fourteenth block 274, the tenth block 270, the eleventh block 271, the seventh block 267, the eighth block 268, and the ninth block 269.

Thus, in the present embodiment, download is managed in block units. The data of a plurality of files may be mixed in a compressed, signed, and encrypted block. However, an already downloaded block will not be downloaded once again. The information processing device 10 manages downloaded blocks, and performs control such that when a group to be hereafter downloaded includes already downloaded blocks, the already downloaded blocks are excluded from download objects, and only blocks not yet downloaded are downloaded. This can efficiently shorten a download time.

FIG. 12G shows the download order for multiple play. Numbers shown in FIG. 12G denote the block numbers. According to the download order, the first group 72a, the third group 72c, the fourth group 72d, and the second group 72b are downloaded in this order. Thus, as shown in FIG. 12G, the blocks are downloaded in order of the first block 261, the second block 262, the sixth block 266, the seventh block 267, the eighth block 268, the ninth block 269, the tenth block 270, the twelfth block 272, the thirteenth block 273, the fourteenth block 274, the eleventh block 271, the third block 263, the fourth block 264, and the fifth block 265.

The above description has been made of the data structure of the game software. In the following, description will be made of a patch file in the present embodiment. The patch file also has a data structure similar to that of the present game software. Specifically, as described above, the patch file also has a nested data structure, and has game data formed as compressed, signed, and encrypted data. Incidentally, the game software is recorded as a non-rewritable image file on the ROM medium 44, or distributed from the content server 12 and recorded onto the auxiliary storage device 2. The patch file is downloaded from the content server 12 at an appropriate time and recorded onto the auxiliary storage device 2, and substituted in a pseudo manner and used in file units or data block units by path overlay processing. That is, when a file included in the game software is updated with the patch file, a path of the patch file, rather than a path of the game software, is set and used for the file. In addition, when the patch file includes an additional scenario file in the game, the patch file is used.

In the following, description will be made of a mechanism of managing compressed, signed, and encrypted patch files in block units. For example, when there are an old patch file of a version 1 and a new patch file of a version 2, and the information processing device 10 has already downloaded the patch file of the version 1, to download blocks including same data in the patch file of the version 2 means wasteful use of network resources and an increase in a processing load on the content server 12. Accordingly, the information processing device 10 reuses data already downloaded in the information processing device 10 without downloading the data from the content server 12. The game manufacturer creates difference information between patch files of different versions. The information processing device 10 obtains the difference information corresponding to the version information of the downloaded patch file from the content server 12, and downloads only data blocks not yet downloaded according to the difference information. Description in the following will be made of a method of creating difference information between different versions of a patch file by difference information generating software in the game manufacturer.

The difference information generating software compares a patch file of a latest version before compression and a patch file of a previous (immediately preceding) version with each other, and thereby determines whether there are same data blocks.

FIGS. 13A to 13C show a method of searching for reusable blocks after the compression. FIG. 13A shows an example of a string of data blocks constituting the patch file of the version 1 before compression. FIG. 13B shows an example of a string of data blocks constituting the patch file of the version 2 before the compression. Here, H represents a hash value of each block. The hash value of each block before the compression is calculated in advance according to a SHA-256 algorithm, for example.

The difference information generating software compares the hash values, and thereby identifies data blocks in the pre-compression patch file of the version 2 which data blocks have same hash values as those of the pre-compression patch file of the version 1. Here, having the same hash values means that data included in the data blocks is the same. Data blocks hatched in FIG. 13B indicate that the data blocks have a different hash value. Data blocks not hatched in FIG. 13B indicate that the data blocks have a same hash value.

Next, the difference information generating software checks which data blocks of the post-compression patch file of the version 2 store the data blocks of the pre-compression patch file of the version 2. For example, a data block having a hash value of H21 is stored in a part of a data block C1 after the compression, and a data block having a hash value of H22 is stored in a part of the data block C1 after the compression and a part of a data block C2. When a check is thus made, it is determined that a data block C4 stores a part of a data block having a hash value of H11 and a part of a data block having a hash value of H12. It is similarly determined that a data block C7 stores a part of a data block having a hash value of H5, a data block having a hash value of H6, and a part of a data block having a hash value of H7. In addition, a data block C11 stores a part of a data block having a hash value of H16 and a part of a data block having a hash value of H17. A data block C13 stores a part of a data block having a hash value of H18 and a part of a data block having a hash value of H19.

This means that the data blocks C4, C7, C11, and C13 of the post-compression patch file of the version 2 do not need to be transmitted to the user who already has the patch file of the version 1. This is because the user has already downloaded the data included in these data blocks C4, C7, C11, and C13 as data included in the patch file of the version 1. On the other hand, the data blocks C1 to C3, C5 to C6, C8 to C10, C12, and C14 include data changed from the patch file of the version 1. It is therefore determined that these data blocks need to be transmitted.

The difference information generating software thus compares the hash values of the respective data blocks in the pre-compression patch files between the different versions, and thereby determines whether or not there are same data blocks. Thereafter, for each data block of the post-compression patch file of the version 2, the difference information generating software creates difference information indicating whether the block includes updated data, or indicating at which address of the post-compression patch file of the version 1 the block is recorded when the block does not include updated data (when the block includes only data of the version 1). The difference information is generated for each data block of the post-compression patch file of the version 2. A flag 0 is set for a data block including data updated in the version 2, whereas for a data block including only data of the version 1, a flag 1 and information indicating a position at which the data block is stored in the patch file of the version 1 are set.

Incidentally, the post-compression patch file of the version 2 may be created by creating the pre-compression patch file of the version 2 and thereafter compressing, signing, and encrypting the pre-compression patch file. However, the same data blocks may be created by decrypting the post-compression patch file of the version 1 and encrypting the patch file again.

A method of generating difference information will be described in the following.

FIGS. 14A to 14D are diagrams of assistance in explaining a method of generating difference information of a block. FIG. 14A shows five blocks P, Q, R, S, and T of the pre-compression patch file of the version 1. FIG. 14B shows blocks 1 to 3 of the post-compression patch file of the version 1. Each of the blocks 1 to 3 is formed in a size of 64 kilobytes. In FIG. 14B, the size of a block including the data of the block T is shown as if the size of the block were different from that of the blocks 1 to 3. In actuality, however, the size of the block is the same with subsequent data before the compression stored therein. It is therefore to be understood that the figure is a mere explanatory diagram. The block 1 after the compression of the version 1 stores the data of the block P and a part of the data of the block Q. The block 2 stores a part of the data of the block Q and a part of the data of the block R. The block 3 stores a part of the data of the block R and the data of the block S.

FIG. 14D shows five blocks P', Q', R, S, and T of the pre-compression patch file of the version 2. FIG. 14C shows blocks 1 to 3 of the post-compression patch file of the version 2. A comparison between the versions of the pre-compression patch files with reference to FIGS. 14A and 14D shows that the data of the block P and the block Q before the compression is updated in the version 2, but that the data of the block R, the block S, and the block T are not updated. (Incidentally, consideration will not be given to the block T in the following description.) The block 1 after the compression of the version 2 stores the data of the block P' and a part of the data of the block Q'. The block 2 stores a part of the data of the block Q' and a part of the data of the block R. The block 3 stores a part of the data of the block R and a part of the data of the block S.

Directing attention to the block 3 of the version 2, the block 3 stores data of the block R and the block S common to the version 1 and the version 2. It is therefore known that when the information processing device 10 has already downloaded the patch file of the version 1, the data stored in the block 3 of the version 2 has already been obtained in the information processing device 10. Accordingly, in the present embodiment, the information processing device 10 reuses the data of the version 1 without downloading the block 3 of the version 2.

For this purpose, the difference information generating software generates difference information including information indicating at which address the data of the block 3 of the version 2 is stored in the version 1 (information indicating a position at which the data of the block 3 of the version 2 is stored in the version 1). As shown in FIGS. 14B and 14C, the data of the block 3 of the version 2 is stored so as to be continuous from an address offset from the start address of the block 1 in the version 1. Therefore, the difference information of the block 3 of the version 2 is recorded as offset information from the start address of the block 1 of the version 1. For example, when the start address of the block 1 is 0, and an amount of offset is 100 kilobytes, the difference information of the block 3 of the version 2 is generated as offset information indicating an address offset by 100 kilobytes from the start address of the block 1. Incidentally, when the amount of offset is defined as an offset within a block, because the start address of the block 1 is 0 and the start address of the block 2 is 64 kilobytes, the amount of offset is set as 36 kilobytes, and thus the difference information of the block 3 of the version 2 may be generated as offset information indicating an address offset by 36 kilobytes from the start address of the block 2.

The difference information generating software thus generates the difference information. Therefore, the information processing device 10 that has downloaded the difference information can refer to the difference information and reuse the data of the block 3 of the version 2 from the patch file of the version 1. Incidentally, because the data of the block 3 of the version 2 is stored so as to straddle the block 2 and the block 3 of the version 1, the information processing device 10 can obtain the data corresponding to the block 3 of the version 2 by decrypting and decompressing the block 2 and the block 3 of the version 1.

The block 1 and the block 2 of the version 2 include the data of the updated blocks P' and Q'. Thus, the difference information of the block 1 and the block 2 of the version 2 is information indicating that the data of the version 1 cannot be reused, that is, information indicating that the updated data is included and that the data of the version 2 is to be used.

As described above, the game manufacturer creates a patch file and difference information, and makes the patch file and the difference information retained in the content server 12 in a downloadable manner. The content server 12 retains the latest patch file and the difference information, and discards and does not retain past patch files.

Description will next be made of a case where a patch file is updated a plurality of times. For example, when two updates are performed, and a patch file of a version 3 is made downloadable from the content server 12, the content server 12 needs to retain difference information between the version 1 and the version 3 and difference information between the version 2 and the version 3 in a downloadable manner. This is because the user does not necessarily always perform an update to the latest patch file, but may have not downloaded the patch file of the version 2 after downloading the patch file of the version 1, for example. Description in the following will be made of a method of creating difference information for each version.

FIGS. 15A to 15D are diagrams of assistance in explaining a method of generating difference information between a plurality of versions. FIG. 15A shows five blocks U, V, W, X, and Y of a pre-compression patch file of a version 1. FIG. 15B shows blocks 1 to 3 of a post-compression patch file of the version 1. Each of the blocks 1 to 3 is formed in a size of 64 kilobytes. The block 1 after the compression of the version 1 stores the data of the block U and a part of the data of the block V. The block 2 stores a part of the data of the block V and a part of the data of the block W. The block 3 stores a part of the data of the block W and the data of the block X.

FIG. 15C shows blocks 1 to 3 of a post-compression patch file of a version 2. In this case, a comparison with the pre-compression patch file of the version 1 shows that the block U is updated to a block U'. The size of compressed data of the block U' in the post-compression patch file of the version 2 is different from that of the block U in the post-compression patch file of the version 1. Thus, the version 1 and the version 2 are out of alignment with each other. The block 1 after the compression of the version 2 stores the data of the block U' and a part of the data of the block V. The block 2 stores a part of the data of the block V and a part of the data of the block W. The block 3 stores a part of the data of the block W and a part of the data of the block X.

FIG. 15D shows blocks 1 to 3 of a post-compression patch file of a version 3. In this case, a comparison with the pre-compression patch file of the version 2 shows that the block V is updated to a block V'. The size of compressed data of the block V' in the post-compression patch file of the version 3 is different from that of the block V in the post-compression patch file of the version 2. Thus, the version 2 and the version 3 are out of alignment with each other. The block 1 after the compression of the version 3 stores the data of the block U' and a part of the data of the block V'. The block 2 stores a part of the data of the block V' and a part of the data of the block W. The block 3 stores a part of the data of the block W and a part of the data of the block X.

As described above with reference to FIGS. 14A to 14D, the game manufacturer has already created the difference information between the version 1 and the version 2 at a point in time that the patch file of the version 2 is created. In addition, when the game manufacturer creates the patch file of the version 3, the game manufacturer creates difference information between the version immediately preceding the version 3, that is, the version 2, and the version 3. The creation of the difference information is as described above with reference to FIGS. 14A to 14D.

Consideration will be given in the following to difference information between the version 1 and the version 3. In the example shown in FIGS. 15A to 15D, the block W and the block X are not changed in the versions 1 to 3. When offsets between previous and subsequent versions, that is, an offset between the version 3 and the version 2 and an offset between the version 2 and the version 1 have already been defined as difference information, an offset between the version 3 and the version 1 can be derived by synthesizing the offsets using the relation shown in the figures.

In this case, when the block 3 of the version 3 refers to the block 2 and the block 3 of the version 2 in the difference information between the version 2 and the version 3 (that is, when the block 3 of the version 3 is included in the block 2 and the block 3 of the version 2), and when the block 2 and the block 3 of the version 2 can both refer to the version 1 (that is, when the block 2 and the block 3 of the version 2 are data blocks included in the version 1), the difference information generating software determines that the block 3 of the version 3 can refer to the blocks of the version 1. That is, in this case, the difference information generating software determines that the block 3 of the version 3 is included in the patch file of the version 1. The difference information generating software can therefore derive an offset between the version 3 and the version 1 in relation to the block 3 of the version 3 by synthesizing the offset between the version 3 and the version 2 and the offset between the version 2 and the version 1.

Figure 16:
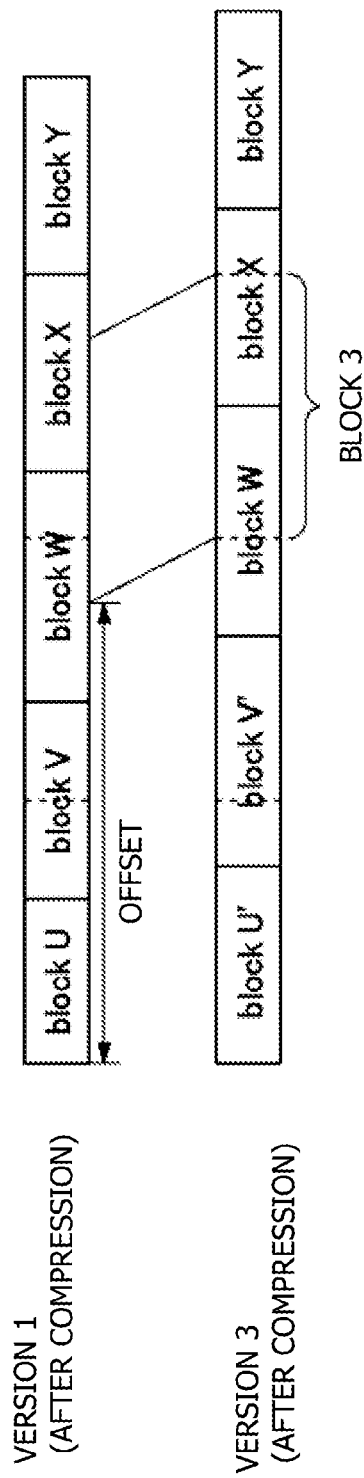
FIG. 16 is a diagram of assistance in explaining a method of synthesizing the difference information.

FIG. 16 is a diagram of assistance in explaining a method of synthesizing difference information. The difference information between the version 1 and the version 3 can be thus derived easily by synthesizing the difference information between the version 1 and the version 2 and the difference information between the version 2 and the version 3. This synthesis is realized by the difference information generating software. Synthesis processing may be performed in the game manufacturer, but may be performed in the content server 12.

The game manufacturer creates the patch file and difference information for each version, and makes the patch file and the difference information for each version retained in the content server 12 in a downloadable manner. The difference information for each version is difference information between the latest version and versions preceding the latest version. When there are a plurality of versions preceding the latest version, a number of pieces of difference information which number corresponds to the number of the plurality of versions preceding the latest version are retained in the content server 12. Incidentally, the processing of synthesizing the difference information may be performed in the content server 12. The game manufacturer may create difference information between the application software and the latest patch file, and make the difference information retained in the content server 12 in a downloadable manner. This is because there may be a user who has never downloaded a patch file when the patch file of the version 3 becomes downloadable, for example. Particularly in a case where the patch file has a function of correcting a bug of the application software, efficient download processing is realized by creating difference information with respect to the application software.

Figure 17:
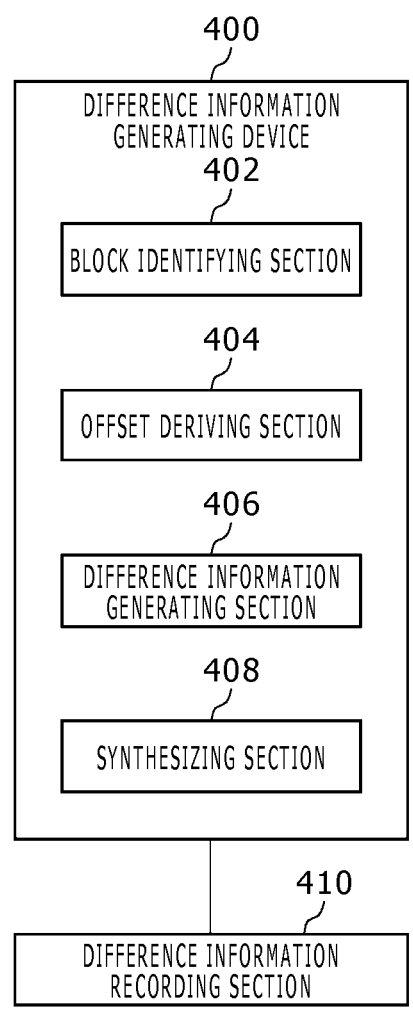
FIG. 17 is a diagram showing functional blocks of a difference information generating device.

FIG. 17 shows functional blocks of a difference information generating device. The difference information generating device 400 includes a block identifying section 402, an offset deriving section 404, a difference information generating section 406, a synthesizing section 408, and a difference information recording section 410. The configuration of these sections is implemented, in terms of hardware components, by the CPU of an arbitrary computer, a memory, a program loaded in the memory, a storage, and the like. In this case, however, the functional blocks implemented by cooperation of these components are depicted. Hence, it is to be understood by those skilled in the art that these functional blocks can be implemented in various forms by only hardware, only software, or combinations of hardware and software. Incidentally, the respective functions of the block identifying section 402, the offset deriving section 404, and the difference information generating section 406 may be implemented by the difference information generating software, which is a development tool used in the game manufacturer. The functions of the synthesizing section 408 may also be implemented by the difference information generating software, but may also be implemented by difference information synthesizing software installed on the content server 12.

The block identifying section 402 compares data blocks included in a first patch file of a version Z (Z is a natural number) with data blocks included in a second patch file of a version (Z+1) subsequent to the first patch file, and thereby identifies identical data blocks. Specifically, the block identifying section 402 compares the hash values of the data blocks of the second patch file with the hash values of the data blocks of the first patch file, and thereby checks whether or not there are data blocks of the first patch file which data blocks have the same hash values as data blocks of the second patch file.

When the hash value of a data block of the second patch file is equal to that of one of the data blocks of the first patch file, the block identifying section 402 determines that the data block of the second patch file is included in the first patch file. At this time, the offset deriving section 404 derives, as offset information, address information indicating a position at which the same data block of the first patch file as the data block of the second patch file is stored. The difference information generating section 406 generates difference information including information indicating whether or not data updated from the first patch file is included for each data block of the second patch file. For a data block including updated data, the difference information generating section 406 sets, as the difference information, a flag 0 indicating that the data block includes the updated data. For a data block not including updated data, the difference information generating section 406 sets, as the difference information, a flag 1 indicating that the data block includes non-updated data and address information (offset information) indicating a position at which the data is stored in the first patch file. The difference information generating section 406 generates the difference information for all of the data blocks of the second patch file, and stores the difference information in the difference information recording section 410.

The above description has been made of the generation of the difference information between the first patch file of the version Z and the second patch file of the subsequent version (Z+1) by the difference information generating section 406. When a third patch file of a version (Z+2) subsequent to the second patch file is generated in the game manufacturer, the difference information generating section 406 generates difference information between the second patch file and the third patch file by the above-described procedure. The difference information generating section 406 thus generates difference information between a newly generated patch file and a patch file of a version preceding the newly generated patch file. The processing of generating the difference information is performed in the game manufacturer.

The processing of synthesizing difference information will be described in the following. Description will be made of a case where first difference information between the first patch file and the second patch file and second difference information between the second patch file and the third patch file are recorded in the difference information recording section 410. Suppose for the convenience of description that Z=1, that is, the first patch file is a patch file of a version 1, the second patch file is a patch file of a version 2, and the third patch file is a patch file of a version 3.

The synthesizing section 408 generates difference information between the first patch file and the third patch file on the basis of the first difference information and the second difference information. This synthesis processing may be performed in the game manufacturer, but may be performed by the difference information synthesizing software of the content server 12 provided with the first difference information and the second difference information from the game manufacturer.

Specifically, the synthesizing section 408 determines whether or not a data block of the third patch file is included in the second patch file on the basis of the second difference information. This determination is made by the synthesizing section 408 by referring to the flag of the data block in the second difference information. When the flag is set at 1, it is determined that the data block of the third patch file is included in the second patch file. For example, suppose that a flag in the second difference information of a data block L of the third patch file is set at 1, and that the data of the data block L is included in a data block M and a data block (M+1) of the second patch file.

The synthesizing section 408 next determines whether or not the data block M and the data block (M+1) of the second patch file are included in the first patch file on the basis of the first difference information. This determination is made by the synthesizing section 408 by referring to the flags of the data blocks in the first difference information. When the flags of the data block M and the data block (M+1) are set at 1, it is determined that these data blocks are included in the first patch file. For example, suppose that the flags in the first difference information of the data block M and the data block (M+1) of the second patch file are set at 1, and that the data of the data block M and the data block (M+1) is included in a data block N, a data block (N+1), and a data block (N+2) of the first patch file.

At this time, the synthesizing section 408 determines that the data block L of the third patch file is included in the data block M and the data block (M+1) of the second patch file, and that the data block M and the data block (M+1) of the second patch file are included in the data block N, the data block (N+1), and the data block (N+2) of the first patch file. It is thus known that the data block L of the third patch file is included in one or more of the data block N, the data block (N+1), and the data block (N+2) of the first patch file. The synthesizing section 408 can derive offset information in the first patch file of the data block L of the third patch file from the offset information of the data block L in the second difference information and the respective pieces of the offset information of the data block M and the data block (M+1) in the first difference information. The synthesizing section 408 can determine whether or not the data block of the third patch file is included in the first patch file by thus referring to the flag value of the second difference information and the flag values of the first difference information. When the data block of the third patch file is included in the first patch file, the synthesizing section 408 can identify the offset information (storage position) in the first patch file of the data of the data block L in the third patch file, using the offset information in the first difference information and the second difference information. The synthesizing section 408 can thus obtain difference information with respect to the first patch file for each data block of the third patch file, and thereby generate the difference information between the first patch file and the third patch file by synthesis processing.

The synthesizing section 408 can thus generate third difference information between the first patch file and the third patch file on the basis of only the first difference information and the second difference information. The content server 12 retains, in a downloadable manner, the latest third patch file, the difference information (second difference information) between the third patch file and the second patch file, and the difference information (third difference information) between the third patch file and the first patch file. Incidentally, the difference information (first difference information) between the first patch file and the second patch file may be discarded.

When a fourth patch file of a version subsequent to the third patch file is generated, difference information (fourth difference information) between the third patch file and the fourth patch file is also generated by the game manufacturer. The second difference information between the third patch file and the second patch file and the third difference information between the third patch file and the first patch file are recorded in the difference information recording section 410. The synthesizing section 408 can generate difference information between the fourth patch file and the second patch file using the fourth difference information and the second difference information, and generate difference information between the fourth patch file and the first patch file using the fourth difference information and the third difference information. Thus, the content server 12 retains, in a downloadable manner, the latest fourth patch file, the difference information between the fourth patch file and the third patch file, the difference information between the fourth patch file and the second patch file, and the difference information between the fourth patch file and the first patch file.

Figure 18:
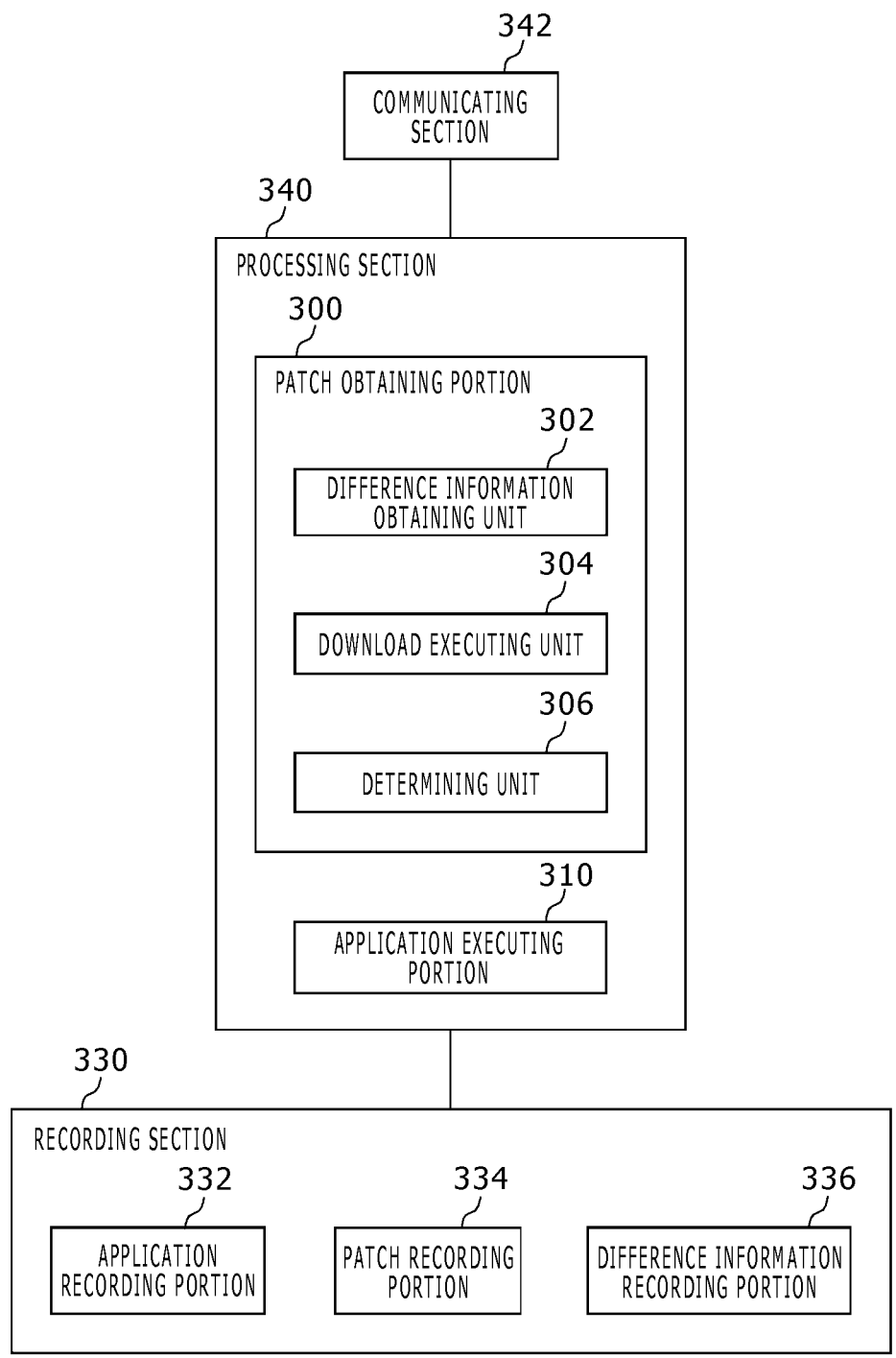
FIG. 18 is a diagram showing functional blocks for performing download processing in the information processing device.

FIG. 18 shows functional blocks for performing download processing in the information processing device 10. In the present embodiment, suppose that application software is already recorded in the information processing device 10, and the download processing is processing of obtaining a patch file or patch data from the content server 12 and recording the patch file or the patch data in the auxiliary storage device 2.

The information processing device 10 includes a processing section 340, a communicating section 342, and a recording section 330. The configuration of these sections is implemented, in terms of hardware components, by the CPU of an arbitrary computer, a memory, a program loaded in the memory, a storage, and the like. In this case, however, the functional blocks implemented by cooperation of these components are depicted. Hence, it is to be understood by those skilled in the art that these functional blocks can be implemented in various forms by only hardware, only software, or combinations of hardware and software.

The recording section 330 includes: an application recording portion 332 in which application software is recorded; a patch recording portion 334 in which patch data obtained from the content server 12 is recorded; and a difference information recording portion 336 in which difference information obtained from the content server 12 is recorded. The application recording portion 332 in this case may be the ROM medium 44 on which the application software is recorded, or may be the auxiliary storage device 2 in which downloaded application software is recorded. The patch recording portion 334 and the difference information recording portion 336 are formed in recording regions of the auxiliary storage device 2.

The communicating section 342 receives operation information indicating an operation of the input section by the user on the input device 6, transmits a request generated in the processing section 340 to the content server 12, and receives data distributed from the content server 12. The communicating section 342 is represented as a configuration combining the functions of the radio communication module 38 and the wire communication module 40 shown in FIG. 2. The radio communication module 38 is in charge of communication with the input device 6. The wire communication module 40 is in charge of communication with the content server 12.

The processing section 340 includes: a patch obtaining portion 300 that obtains patch data from the content server 12; and an application executing portion 310 that executes an application using the application software and the patch data. The patch obtaining portion 300 in this case includes a difference information obtaining unit 302, a download executing unit 304, and a determining unit 306.

The difference information obtaining unit 302 manages the version information of patch files recorded in the patch recording portion 334. This version information may be recorded in the patch recording portion 334. When the communicating section 342 receives a request to obtain a patch file from the input device 6, the difference information obtaining unit 302 reads latest version information of patch files downloaded in the past from the patch recording portion 334. For example, when the patch file of the version 1 and the patch file of the version 2 are already recorded in the patch recording portion 334, the difference information obtaining unit 302 reads the version information of the latest version 2. Incidentally, in a case where the patch file of the version 1 including usable data is also treated as the patch file of the version 2 at a point in time that the patch file of the version 2 is recorded in the patch recording portion 334, only the patch file of the latest version is recorded in the patch recording portion 334 at all times. The difference information obtaining unit 302 reads the version information of the patch file of that version.

The difference information obtaining unit 302 includes the version information of the retained patch file in a request to obtain difference information, and transmits the obtaining request to the content server 12. Receiving the obtaining request, the content server 12 transmits the difference information corresponding to the specified version information to the information processing device 10. For example, when the content server 12 retains the patch file of the version 3 in a downloadable manner, and the version information included in the obtaining request indicates the version 2, the content server 12 transmits the difference information between the version 2 and the version 3. Incidentally, when only the patch file of the version 1 is recorded in the patch recording portion 334, the version information of the version 1 is included in the request to obtain the difference information. The content server 12 therefore transmits the difference information between the version 1 and the version 3.

The difference information obtaining unit 302 thus obtains the data block difference information between the latest patch file retained by the content server 12 and the patch file recorded in the patch recording portion 334. That is, the difference information obtaining unit 302 obtains, from the content server 12, the difference information corresponding to the version information of the patch file recorded in the patch recording portion 334, and records the difference information in the difference information recording portion 336.

According to the obtained difference information, the download executing unit 304 downloads updated data blocks from the latest patch file retained in the content server 12. The difference information includes, for each data block of the latest patch file, either information indicating a storage position in the patch data already recorded in the patch recording portion 334 or information indicating that the data block is an updated data block. Hence, the download executing unit 304 downloads only data blocks for which information indicating that the data blocks are updated data blocks is described, but does not download data blocks for which address offsets in the recorded patch data are described as difference information.

When the latest patch file retained in the content server 12 is formed by 10000 data blocks (16 megabytes), for example, and address offsets are described for 9000 data blocks, it suffices for the download executing unit 304 to download 1000 data blocks. As compared with a case of downloading 16 megabytes, the amount of the downloaded data is reduced to $\frac{1}{10}$. Thus, a time taken to perform the download can be shortened, and a processing load on the content server 12 can be reduced. The download executing unit 304 transmits a download request specifying block numbers to the content server 12. The content server 12 transmits the data blocks of the specified block numbers to the information processing device 10. The download executing unit 304 records the obtained patch data in the patch recording portion 334 in association with the version information.

The download executing unit 304 may obtain order information indicating download order from the content server 12 before transmitting the download request. Before the user downloads patch data, options of "preferentially download patch data for single play" and "preferentially download patch data for multiple play" are presented on the screen of the output device 4. According to a selected option, the content server 12 provides the information processing device 10 with order information indicating the download order of groups and a group file related to the patch. Receiving the order information, the download executing unit 304 downloads the patch data from the content server 12 according to the order information. As described above in relation to the download order of the game software with reference to FIGS. 12A to 12G, the download order of the patch file in the present embodiment can also be set in group units. Thereby efficient download processing suited to the needs of the user may be performed.

The determining unit 306 determines whether the patch file is recorded in the patch recording portion 334 in group units. The determining unit 306 determines whether all of files belonging to a group are recorded in the patch recording portion 334 by referring to the group file obtained by the download executing unit 304. Incidentally, there is a possibility of one file being included in patch data of a plurality of versions. Therefore, the determining unit 306 grasps versions and block numbers in the versions that data blocks constituting the file correspond to on the basis of the difference information, and determines, for each of the files belonging to the group, whether all data blocks are recorded in the patch recording portion 334. When the determining unit 306 determines that all of the files belonging to the group are recorded in the patch recording portion 334, the determining unit 306 may notify the application executing portion 310 of that effect to thereby enable the application to recognize that the files of the group can be used.

The application executing portion 310 executes the application using the application software recorded in the application recording portion 332 and the patch data recorded in the patch recording portion 334. As already described, the application may be a game. The application executing portion 310 identifies storage positions of data blocks constituting the file using the difference information, and reads necessary patch data from the patch recording portion 334. When one file is recorded as patch data of different versions, path information for each piece of data is set, and read from the patch recording portion 334. This path information is set according to the difference information.

Thus, according to the present embodiment, the download executing unit 304 does not download data blocks storing only data already recorded in the patch recording portion 334 in patch data download processing. As a result, the amount of data recorded in the patch recording portion 334 can be reduced, and the recording region of the patch recording portion 334 can be used effectively. As compared with a downloading method that downloads the whole of a latest patch file and deletes a patch file downloaded in the past, the downloading method according to the present embodiment needs to download only necessary data blocks, and can therefore greatly shorten a time taken to perform the download.

The present technology has been described above on the basis of embodiments thereof. The embodiments are illustrative, and it is to be understood by those skilled in the art that combinations of constituent elements and processing processes of the embodiments are susceptible of various modifications and that such modifications also fall within the scope of the present technology. In the embodiments, a game is shown as an example of an application. However, the application may be another application than a game.

The present technology contains subject matter related to that disclosed in Japanese Priority Patent Application JP 2014-087219 filed in the Japan Patent Office on Apr. 21, 2014, the entire content of which is hereby incorporated by reference.

What is claimed is:

1. An information processing device comprising:
    an application recording portion in which application software is recorded;
    a patch obtaining portion obtaining patch data from a server;
    a patch recording portion in which the obtained patch data is recorded; and
    an application executing portion executing an application using the application software and the patch data, wherein
    the patch obtaining portion includes a difference information obtaining unit obtaining data block difference information between a latest patch file retained by the server and a patch file recorded in the patch recording portion, wherein
    the difference information corresponds to version information of the patch file recorded in the patch recording portion, and
    a download executing unit downloading an updated data block from the latest patch file according to the difference information.

2. The information processing device according to claim 1, wherein the difference information obtaining unit obtains the difference information from the server.

3. The information processing device according to claim 1, wherein the difference information includes one of information indicating a storage position in the patch data recorded in the patch recording portion and information indicating that a data block is updated.

4. The information processing device according to claim 1, wherein the application executing portion executes the application using the difference information.

5. The information processing device according to claim 1, wherein
the application software and the patch file are each formed by a plurality of files, and each file belongs to at least one of a plurality of groups, and
the information processing device further comprises
a determining unit determining whether the files are recorded in group units.

6. The information processing device according to claim 1, wherein the patch data is encrypted data.

7. A difference information generating device comprising:
a recording section in which first difference information between a first patch file and a second patch file of a version subsequent to the first patch file and second difference information between the second patch file and a third patch file of a version subsequent to the second patch file are recorded; and
a synthesizing section generating difference information between the first patch file and the third patch file on a basis of the first difference information and the second difference information,
wherein the difference information includes, for each data block of a patch file of a new version, information indicating whether or not the data block includes data updated from a patch file of a previous version, and when the data block does not include the updated data, the difference information includes address information indicating a data storage position in the patch file of the previous version.

8. A non-transitory, computer readable recording medium containing a computer program for a computer, which when executed by the computer causes the computer to execute actions, comprising:
recording application software in an application recording portion;
obtaining patch data from a server and recording the patch data in a patch recording portion;
executing an application using the application software and the patch data;
obtaining data block difference information between a latest patch file retained by the server and a patch file recorded in the patch recording portion, wherein the data block difference information corresponds to version information of the patch data recorded in the patch recording portion; and
downloading an updated data block from the latest patch file according to the difference information.

9. A non-transitory, computer readable recording medium containing a computer program for a computer, which when executed by the computer causes the computer to execute actions, comprising:
reading first difference information between a first patch file and a second patch file of a version subsequent to the first patch file and second difference information between the second patch file and a third patch file of a version subsequent to the second patch file from a recording section in which the first difference information and the second difference information are recorded; and
generating difference information between the first patch file and the third patch file on a basis of the first difference information and the second difference information,
wherein the difference information is configured to include, for each data block of a patch file of a new version, information indicating whether or not the data block includes data updated from a patch file of a previous version, and when the data block does not include the updated data, the difference information includes address information indicating a data storage position in the patch file of the previous version.

\* \* \* \* \*